(12) United States Patent
Yu

(10) Patent No.: US 8,993,198 B2
(45) Date of Patent: Mar. 31, 2015

(54) PROCESS OF PREPARING PT/SUPPORT OR PT ALLOY/SUPPORT CATALYST, THUS-PREPARED CATALYST AND FUEL CELL COMPRISING THE SAME

(75) Inventor: Jong-Sung Yu, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 907 days.

(21) Appl. No.: 12/894,897

(22) Filed: Sep. 30, 2010

(65) Prior Publication Data

US 2011/0065025 A1 Mar. 17, 2011

(30) Foreign Application Priority Data

Aug. 10, 2009 (KR) .................. 10-2009-0073164
Oct. 23, 2009 (KR) .................. 10-2009-0101074

(51) Int. Cl.

| H01M 8/02 | (2006.01) |
| B01J 23/42 | (2006.01) |
| B01J 23/46 | (2006.01) |
| B01J 35/00 | (2006.01) |
| B01J 37/03 | (2006.01) |
| B01J 37/16 | (2006.01) |
| H01M 4/88 | (2006.01) |
| H01M 4/92 | (2006.01) |
| H01M 8/10 | (2006.01) |

(52) U.S. Cl.
CPC .............. *B01J 23/42* (2013.01); *B01J 23/462* (2013.01); *B01J 35/006* (2013.01); *B01J 37/031* (2013.01); *B01J 37/16* (2013.01); *H01M 4/8825* (2013.01); *H01M 4/926* (2013.01); *H01M 8/1004* (2013.01); *Y02E 60/521* (2013.01)
USPC ....................................... 429/524; 502/304

(58) Field of Classification Search
USPC .......... 429/483, 524; 502/304, 309, 326, 330, 502/331, 339
See application file for complete search history.

(56) References Cited

U.S. PATENT DOCUMENTS 3,842,017 A * 10/1974 Armistead .................... 502/339
2010/0248071 A1 * 9/2010 Konishi et al. ............... 429/483

OTHER PUBLICATIONS

Minsik, Kim; Chaudhari, Nitin K.; Fang, Baizeng; Yu, Jongsung; "Novel Synthesis of Supported Pt-Based Catalysts for Proton Exchange Membrane Fuel Cell"; APCSEET UPC 2009, Qingdao, China; 7th Asia Pacific Congress on Sustainable Energy & Environmental Technologies; Abstracts Book; Oct. 15-17, 2009; p. 152.

(Continued)

*Primary Examiner* — Cynthia H Kelly
*Assistant Examiner* — Monique Wills
(74) *Attorney, Agent, or Firm* — Alston & Bird LLP

(57) ABSTRACT

Disclosed is a method for preparing a platinum/support catalyst or a platinum alloy/support catalyst, including: a) preparing a dispersion solution including urea, a support and a water-soluble salt of at least one metal(s) having catalytic activity; (b) reacting the dispersion solution at high temperature so as to deposit the metal hydroxide particles derived from the at least one metal(s) on the support; and (c) reducing the metal hydroxide particles. The size and distribution of the platinum particles or platinum alloy particles are greatly improved by the use of urea.

1 Claim, 21 Drawing Sheets

(56) References Cited

OTHER PUBLICATIONS

Fang, Baizeng; Chaudhari, Nitin K.; Minsik, Kim; Kim, Jung Ho; Yu, Jongsung; "Homogenous Deposition of Platinum Nanoparticles on Carbon Black for Proton Exchange Membrane Fuel Cell"; J. Am. Chem. Soc. 2009, 131, 15330-15338; Published on Web Oct. 1, 2009.

Oh, H. et al., *Preparation of Pt/C Catalyst Using Alcohol Reduction and a Polyol Process in the Presence of Urea for Oxygen Reduction Reaction*, Res. Chem. Intermed., vol. 34, Nos. 8-9, (2008), pp. 853-861.

* cited by examiner

FIG. 14
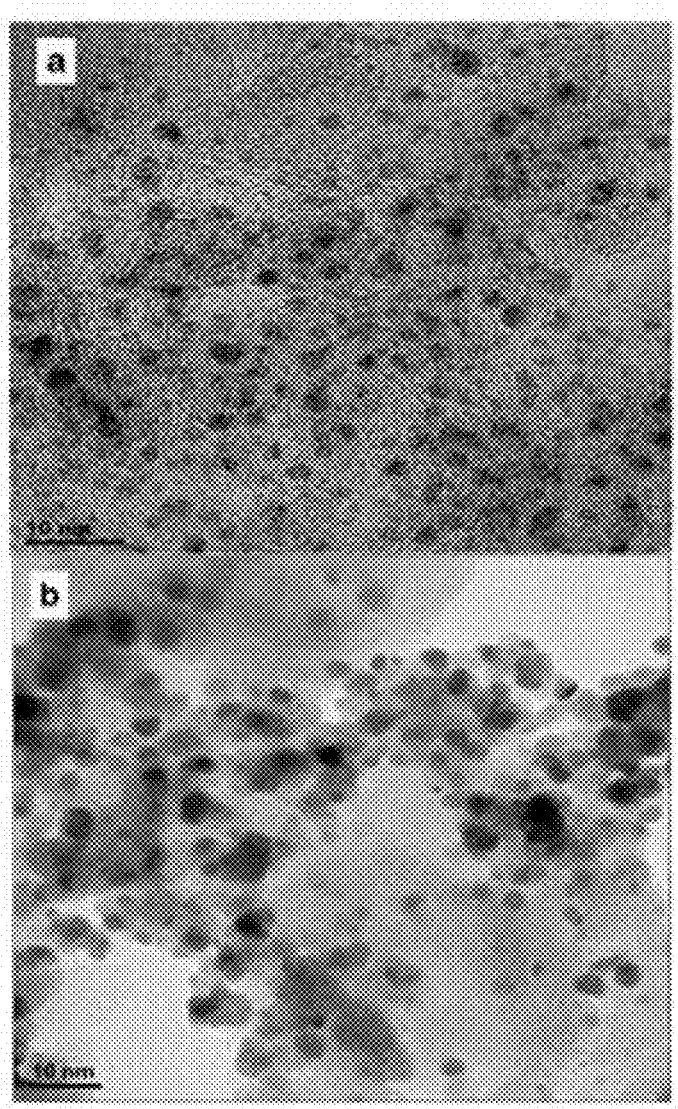
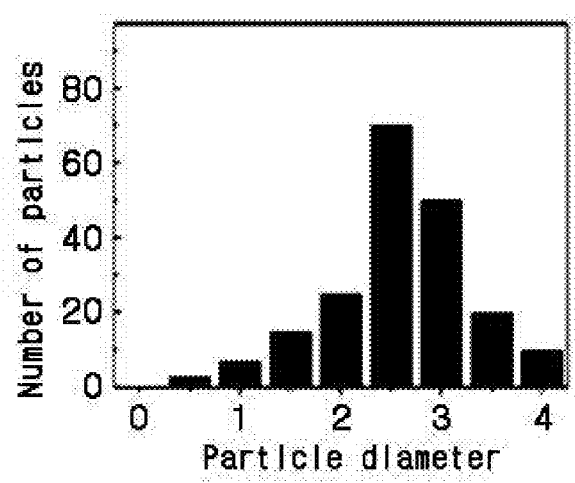

PROCESS OF PREPARING PT/SUPPORT OR PT ALLOY/SUPPORT CATALYST, THUS-PREPARED CATALYST AND FUEL CELL COMPRISING THE SAME

CROSS-REFERENCE TO RELATED APPLICATIONS

This application claims priority under 35 U.S.C. §119 to Korean Patent Application Nos. 10-2009-0073164 and 10-2009-0101074, filed on Aug. 10, 2009 and Oct. 23, 2009, respectively, in the Korean Intellectual Property Office, the disclosure of which is incorporated by reference in its entirety.

TECHNICAL FIELD

The present disclosure relates to a method for preparing a platinum/support catalyst or a platinum alloy/support catalyst. More particularly, the disclosure relates to a method for preparing a platinum/support catalyst or a platinum alloy/support catalyst having improved catalytic activity by easily regulating particle size and improving dispersion and size distribution of platinum particles or platinum alloy particles, thus-prepared catalysts, and a fuel cell including the same.

BACKGROUND

Carbon and metal oxides on which metal nanoparticles are loaded have been studied as catalysts and adsorbents for various organic and electrochemical reactions, including epoxy reaction, Heck reaction, oxidation and reduction in a fuel cell or a lithium-ion battery, hydrogen storage, or the like. Especially, a fuel cell which converts chemical energy to electrical energy via an electrochemical reaction by supplying fuel such as hydrogen or methanol is a next-generation, environment-friendly energy source, requiring no exchange or recharging of the cell as long as fuel continues to be provided to the cell. The fuel cell has been gaining attentions as an alternative energy source for environment-friendly automobiles, home and portable electronics and is being studied actively. The electrode performance of a fuel cell is greatly affected by the chemical composition, size, distribution, stability, etc. of catalyst nanoparticles for the oxidation and reduction electrodes. Further, it is also significantly affected by the easiness of mass transfer such as diffusion of reactants to the catalytic layer or discharge of reaction products, which in turn is related with the reaction surface area, pore structure, distribution and connectivity in the electrode catalytic layer.

Especially, proton exchange membrane (PEM) or polymer electrolyte membrane (PEM) fuel cells are of great interest as an energy source for applications requiring large power such as vehicles and transportations. The principle of the PEM fuel cell is as follows. The fuel cell includes an anode, a cathode and a polymer electrolyte membrane which physically separates them. At the anode, hydrogen or alcohol such as ethanol, methanol, etc. is supplied, and oxygen is supplied to the cathode. If a circuitry is constructed after connecting wires to the anode and the cathode by, for example, connecting an external power consuming circuit, the fuel cell begins operation. Recently, technical developments of a hydron-fed PEM fuel cell or direct-methanol fuel cell (DMFC), a type of a PEM fuel cell, have been made actively and commercialization is not distant. However, the commercialization of such fuel cells is hindered by some challenges, one of them being the high cost of platinum (Pt)-based catalysts. To solve this problem, efforts have been made to improve catalytic activity and thereby reduce the usage of platinum.

In general, it is known that the activity of a catalyst loaded on a support is largely dependent on the size and dispersity of metal particles. In order to reduce the size of platinum or platinum-M (M=Ru, Rh, Mo, Os, Ir, Re, Pd, V, W, Co, Fe, Se, Ni, bi, Sn, Cr, Cu, Ti, Au, Ce, . . . , Fe—Mo, Fe—Co, Ru—Fe, Ru—Co, Ru—Mo, . . . , Ru—Fe—Co, Ru—Fe—Mo, . . . etc) alloy particles and improve dispersity, various catalyst synthesis strategies have been developed, including impregnation reduction, colloidal methods, microemulsion methods, ion exchange, or the like. However, most of them are unsuccessful in adequately controlling particle size and dispersion, or are very complex, time-consuming and ineffective in removing residual protective agents.

Although these methods allow a relatively small and narrow size distribution of catalyst nanoparticles at low loading conditions of 20 to 30 wt %, the size, distribution and dispersion become unsatisfactory at high loading of 40 wt % or more. Further, since the synthesis is mainly carried out at high temperature, and expensive solvents and sometimes environmentally harmful chemicals are used, the methods are disadvantageous in cost and may result in environmental pollution. Also, the complex processes involved are time-consuming and, especially under metal loading, it is difficult to control the particle size, distribution and dispersion. Accordingly, there is an increasing need on the development of a stable, easy and effective catalyst synthesis method allowing the preparation of platinum or Pt-M alloy nanoparticles that can be dispersed uniformly and loaded stoichiometrically uniformly.

SUMMARY

The present disclosure is directed to providing a simple and environment-friendly method for preparing a platinum/support catalyst or a platinum alloy/support catalyst having high catalytic activity with small particle size and uniform dispersion of platinum particles or platinum alloy particles loaded on a support while having more platinum or platinum alloy particles loaded on the support without much sacrificing of the particle size and dispersion.

The present disclosure is also directed to providing a platinum/support catalyst or a platinum alloy/support catalyst prepared by the method.

The present disclosure is also directed to providing a fuel cell including the platinum/support catalyst or the platinum alloy/support catalyst.

In one general aspect, the present disclosure provides a method for preparing a catalyst with platinum loaded on a support, including: (a) preparing a dispersion solution including urea, a support and a water-soluble salt of at least one metal(s) having catalytic activity; (b) reacting the dispersion solution at high temperature so as to deposit the metal hydroxide particles derived from the at least one metal(s) on the support; and (c) reducing the metal hydroxide particles.

In an embodiment of the present disclosure, the present disclosure provides a method for preparing a platinum/carbon catalyst, including: dissolving urea in water to prepare an aqueous urea solution; dispersing a carbon support in the aqueous urea solution and adding chloroplatinic acid or proper platinum ion sources thereto; reacting hydroxide ions resulting from hydrolysis of urea with the ion of Chemical Formula 1 produced as chloroplatinic acid hydrated or platinum ion hydrated to form a chloroplatinic hydroxide compound or platinum ion hydroxide and adsorbing it on the carbon support; and reducing the chloroplatinic hydroxide compound or platinum ion hydroxide adsorbed on the carbon support to platinum particles by adding ethylene glycol or microwave reduction method, wherein the particle size and dispersion of the platinum particles are determined by the amount of urea dissolved in the aqueous urea solution:

$$[PtCl_{6-x}(H_2O)_x]^{-2+x} (x=0,1,2) \tag{1}$$

In an embodiment of the present disclosure, a loading amount of the platinum particles on the platinum/carbon catalyst may be 10-80 wt %.

In another embodiment of the present disclosure, the carbon support may be carbon black, carbon nanotube, carbon nanofiber, mesoporous carbon, multimodal porous carbon, multilayer carbon structure or its composite with metal oxides.

In another embodiment of the present disclosure, said dispersing the carbon support in the aqueous urea solution may be carried out by ultrasonic dispersion.

In another embodiment of the present disclosure, said reacting hydroxide ions resulting from hydrolysis of urea with the ion of Chemical Formula 1 produced as chloroplatinic acid hydrated can form a chloroplatinic hydroxide compound and adsorb it on the carbon support may be performed at 70-110° C.

In another embodiment of the present disclosure, said reducing the chloroplatinic hydroxide compound adsorbed on the carbon support to platinum particles by adding ethylene glycol may be performed at 100-140° C. or by heating for 1-10 minutes using microwave oven.

In another embodiment of the present disclosure, said reacting hydroxide ions resulting from hydrolysis of urea with the ion of Chemical Formula 1 produced as chloroplatinic acid hydrated to form a chloroplatinic hydroxide compound and adsorbing it on the carbon support may be performed at pH 7-11.

In another embodiment of the present disclosure, a particle size distribution of the platinum particles adsorbed on the carbon support may be 1-5 nm.

In another general aspect, the present disclosure provides a method for preparing a catalyst with platinum loaded on a support, including: (a) dissolving a water-soluble salt of a metal having catalytic activity and urea in water and dispersing a support to prepare a homogeneous dispersion solution; (b) stirring the homogeneous dispersion solution at high temperature to deposit metal hydroxide particles on the surface of the support; and (c) reducing the metal hydroxide particles deposited on the support.

In an embodiment of the present disclosure, the step (a) may include dissolving a water-soluble salt of a metal having catalytic activity and urea in water to prepare a metal-urea solution, dispersing a support in an aqueous solution to prepare a dispersion of the support, and mixing the metal-urea solution with the dispersion solution of the support. Sodium hydroxide may be added to the dispersion solution of the support to adjust acidity to a specific pH.

In another embodiment of the present disclosure, the dispersion solution prepared in the step (a) may have an acidity of pH 5-12.

In another embodiment of the present disclosure, in the step (a), urea may be added in an amount of 5-200 equivalents based on moles of the water-soluble salt of the metal.

In another embodiment of the present disclosure, the step (a) may include: dissolving a water-soluble salt of a metal having catalytic activity in water to prepare an aqueous metal salt solution; dissolving urea in water to prepare an aqueous urea solution; mixing the aqueous metal salt solution with the aqueous urea solution; and dispersing a support in the mixture of the aqueous metal salt solution and the aqueous urea solution.

In another embodiment of the present disclosure, the water-soluble salt of a metal may include platinum and at least one metal(s) selected from a group consisting of ruthenium, rhodium, molybdenum, osmium, iridium, rhenium, palladium, vanadium, tungsten, cobalt, iron, selenium, nickel, bismuth, tin, chromium, copper, titanium, gold and cerium.

In another embodiment of the present disclosure, platinum alloy may be loaded in an amount of 5-95 wt % of the total weight of the catalyst.

In another embodiment of the present disclosure, the step (b) may be performed at 60-120° C.

In another embodiment of the present disclosure, in the step (b), hydroxide ions for depositing the metal hydroxide particles on the surface of the support may be produced by hydrolysis of urea.

In another embodiment of the present disclosure, in the step (b), hydroxide ions for depositing the metal hydroxide particles on the surface of the support may be produced from the sodium hydroxide added to the dispersion solution of the support and by hydrolysis of urea.

In another embodiment of the present disclosure, the support may be at least one carbon support(s) selected from a group consisting of Vulcan carbon, carbon nanotube, carbon nanowire, carbon having a multimodal porous structure and carbon capsule.

In another embodiment of the present disclosure, the support may be at least one selected from a group consisting of titanium dioxide, cecium oxide, molybdenum oxide, silica, aluminum oxide and manganese dioxide, or a composite of at least one selected from a group consisting of titanium dioxide, cecium oxide, molybdenum oxide, silica, aluminum oxide and manganese dioxide bonded to carbon.

In another embodiment of the present disclosure, in the step (c), at least one reducing agent(s) selected from a group consisting of an aqueous solution of $NaBH_4$, $LiBH_4$, HCHO, HCOOH, $CH_3OH$, $CH_3CH_2OH$, HCOONa, $N_2H_4$ or $AlBH_4$ and ethylene glycol may be used.

In another embodiment of the present disclosure, the reduction of the step (c) may be performed at 50-400° C. under hydrogen atmosphere.

In another embodiment of the present disclosure, a step of separating the support with the metal hydroxide particles deposited from the dispersion solution may be further included prior to the step (c).

In another general aspect, the present disclosure provides a platinum/carbon catalyst prepared by the above method.

In another general aspect, the present disclosure provides a proton exchange membrane fuel cell (PEMFC) including the platinum/carbon catalyst.

Specifically, in an embodiment of the present disclosure, there is provided a platinum alloy/support catalyst including a carbon support and platinum alloy loaded on the carbon support, wherein the loaded platinum alloy particles have a size of 2-3 nm as calculated from the platinum (220) peak of an X-ray diffraction pattern by the Scherrer equation or individual particle sizes of 100-600 nanoparticles found in transmission electron microscopy (TEM) or scanning electron microscopy (SEM) images.

In another embodiment of the present disclosure, the platinum alloy/support catalyst may be prepared by the above-described methods.

In another general aspect, the present disclosure provides a fuel cell including the platinum alloy/carbon catalyst prepared by the above methods.

Other features and aspects will be apparent from the following detailed description, the drawings, and the claims.

BRIEF DESCRIPTION OF THE DRAWINGS

The above and other objects, features and advantages of the present disclosure will become apparent from the following description of certain exemplary embodiments given in conjunction with the accompanying drawings, in which:

FIG. 14 shows HRTEM images of nanoparticles of Example 1-1 and Comparative Example 1 and size and distribution of nanoparticles of Example 1-1;

DETAILED DESCRIPTION OF EMBODIMENTS

Figure 1:
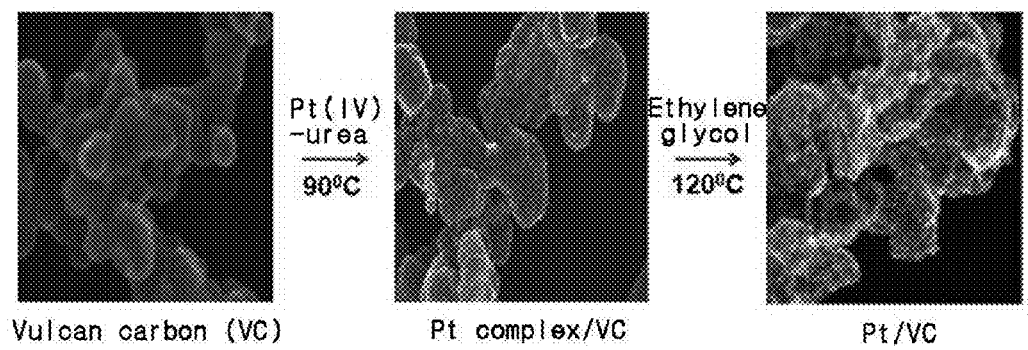
FIG. 1 schematically illustrates a homogeneous deposition (HD)-ethylene glycol (EG) method.

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting the example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

In an embodiment of the present disclosure, there is provided a method for preparing a catalyst with platinum loaded on a support, comprising: (a) preparing a dispersion solution comprising urea, a support and a water-soluble salt of at least one metal(s) having catalytic activity; (b) reacting the dispersion solution at high temperature so as to deposit the metal hydroxide particles derived from the at least one metal(s) on the support; and (c) reducing the metal hydroxide particles.

In another embodiment of the present disclosure, there is provided a method for preparing a platinum/carbon catalyst, comprising: dissolving urea in water to prepare an aqueous urea solution; dispersing a carbon support in the aqueous urea solution and adding chloroplatinic acid thereto; reacting hydroxide ions resulting from hydrolysis of urea with the ion of Chemical Formula 1 produced as chloroplatinic acid is hydrated to form a chloroplatinic hydroxide compound and adsorbing it on the carbon support; and reducing the chloroplatinic hydroxide compound adsorbed on the carbon support to platinum particles by adding ethylene glycol, wherein the particle size and distribution of the platinum particles are determined by the amount of urea dissolved in the aqueous urea solution:

$$[PtCl_{6-x}(H_2O)_x]^{2+x} (x=0,1,2) \quad (1)$$

In general, platinum may be loaded on a platinum-supported platinum/carbon catalyst in an amount of 20-60 wt %. The loading amount of platinum of the platinum/carbon catalyst expressed in wt % refers to a weight proportion of platinum to the total weight of the platinum/carbon catalyst. The lower the platinum loading, the thicker the electrode catalyst layer has to be for the same amount of platinum to be loaded on the carbon support. Thus, it is important to increase platinum loading to make the electrode catalyst layer thin, which decreases mass transfer resistance in the electrode catalyst layer. Unfortunately, with the existing method for preparing platinum/carbon catalysts, high platinum loading results in the agglomeration of platinum particles and it is difficult to attain high catalytic activity. Since the activity of metal catalysts is strongly dependent on size and dispersion of the catalyst particles, development of a technique capable of preparing superb catalyst while increasing loading amount is highly required.

In accordance with the present disclosure, a chloroplatinic hydroxide compound with controlled particle size is prepared by adjusting acidity using urea, and the chloroplatinic hydroxide compound is reduced to platinum by a polyol process using ethylene glycol as a precursor of a reducing agent. As a result, a platinum/carbon catalyst with small particle size and uniform dispersity and particle size distribution can be prepared while maintaining high platinum loading.

In the present disclosure, the size of the platinum particles adsorbed on the carbon support is dependent on the acidity of aqueous solution, which may be adjusted by varying the amount of urea dissolved in water. Urea permits in-situ, gradual and homogeneous generation of hydroxide ions ($OH^-$) throughout the solution, and prevents local supersaturation or precipitation of the metal hydroxide. As a result, the metal hydroxide precursor is slowly and homogeneously adsorbed on the support, and precipitation of the reactant metal as a result of chemical reaction with the support occurs only on the surface thereof, and nucleation of the metal in the solution is avoided. The carbon support used in the present disclosure refers to a material on which platinum particles may be adsorbed. Various materials including carbon black, carbon nanotube, carbon nanofiber, mesoporous carbon, multimodal porous carbon, and multilayer carbon structure may be used.

Based on the above description, the present disclosure provides a simple, effective and environment-friendly method for preparing a platinum/carbon catalyst compared with conventional preparation methods. The method for preparing a platinum/carbon catalyst according to the present disclosure combines the advantage of the urea-assisted homogeneous deposition (HD) approach, reflected by in situ pH value adjustment/control through hydrolysis of urea, with the advantage of the polyol process, namely, homogeneous in situ generation of reducing species for the reduction of deposited platinum complexes using ethylene glycol (EG), and hence will be referred to as the HD-EG method. The acidity adjustment can be realized by varying the amount of urea added to the starting aqueous solution instead of external addition of an alkaline solution. The one-pot reduction of platinum complexes by a polyol process conducted at a temperature lower than 130° C. not only makes the synthesis of the platinum/carbon catalyst simpler and more efficient but also enables high loading of platinum compared with conventional existing reduction methods. Furthermore, the increase in size and agglomeration of platinum particles can be avoided.

A process of preparing a platinum/carbon catalyst with a platinum loading amount of 60 wt % according to the present disclosure will be described in detail. First, urea (150 mg) is dissolved in distilled water (200 mL) to prepare an aqueous urea solution. Then, after adding Vulcan carbon (VC, 32.5 mg), the mixture solution is subjected to dispersion for about 30 minutes using an ultrasonicator. Then, after adding 0.05 M chloroplatinic acid ($H_2PtCl_6$, 5 mL), the solution is stirred for 3 hours. Subsequently, the mixture solution is heated to about 90° C. and is allowed to stand for about 1-10 hours so that hydrolysis of urea may occur. Then, after cooling to room temperature, followed by addition of ethylene glycol (200 mL) and stirring for 3 hours, the solution is heated to 120° C. and allowed to stand for 1-5 hour(s). Alternatively, the solution is heated for 1-10 minutes using microwave (2450 MHz, 700 W) and, after stirring overnight, the resulting catalyst slurry is filtered and washed with copious amount of water. Thus prepared catalyst is dried at 80° C. overnight.

The process for preparing the platinum/carbon catalyst may be separated into the steps of: dissolving urea in water to prepare an aqueous urea solution; dispersing a carbon support in the aqueous urea solution and adding chloroplatinic acid thereto; reacting hydroxide ions resulting from hydrolysis of urea with the ion of Chemical Formula 1 produced as chloroplatinic acid hydrated to form a chloroplatinic hydroxide compound and adsorb it on the carbon support; and reducing the chloroplatinic hydroxide compound adsorbed on the carbon support to platinum particles by adding ethylene glycol. The step of reacting hydroxide ions resulting from hydrolysis of urea with the ion of Chemical Formula 1 produced as chloroplatinic acid hydrated to form a chloroplatinic hydroxide compound and adsorb it on the carbon support may be performed at 70-110° C. and pH 7-11. If the temperature of the solution is below 70° C., the reaction may not occur smoothly. And, if it exceeds 110° C., agglomeration may occur. If the pH of the solution is between 7 and 11, the particle size and distribution of platinum particles may be stable. And, the step of reducing the chloroplatinic hydroxide compound adsorbed on the carbon support to platinum particles by adding ethylene glycol may be performed at 100-140° C. or by heating for 5 minutes using microwave (2450 MHz, 700 W). At this temperature range, side reactions resulting from fast reduction may be avoided.

The associated chemical reactions will be described referring to FIG. 1 and reaction formulae and main factors affecting the properties of the catalyst will be described. FIG. 1 schematically illustrates the HD-EG method. Referring to FIG. 1, the present disclosure of platinum/carbon catalyst comprises the steps of: adding urea and a platinum compound to VC to prepare a platinum (Pt(IV)) complex species/VC; and reducing the platinum complex species using ethylene glycol to obtain Pt/VC.

The first step is a urea-assisted HD process. During this step, urea is hydrolyzed in the acidic platinum salt solution at a temperature above 90° C. to generate hydroxide ions gradually and homogeneously through the solution. Thus, sudden local pH increase may be avoided and platinum hydroxide turns into chloroplatinic hydroxide. The hydrolysis of urea may be expressed by Reaction Formula 1:

Reaction Formula 1

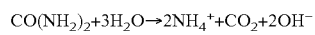

In an acidic solution, chloroplatinic acid is mainly present as $[PtCl_6]^{2-}$ and $[PtCl_{6-x}(H_2O)_x]^{2+x}$ (x=0, 1, 2), generated through the following reaction:

Reaction Formula 2

When OH⁻ is added (or generated in situ), the following reactions will take place:

Reaction Formula 3

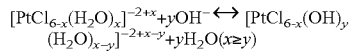

or

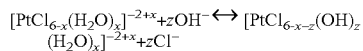

Thus, for a urea-assisted HD process, the size of chloroplatinic hydroxide species $(PtCl_{6-x}(OH)_y(H_2O)_{x-y}, PtCl_{6-x-z}(OH)_z(H_2O)_x)$ deposited on VC depend greatly on the concentration of OH⁻, and accordingly on the amount of urea in the starting solution.

The second step is a reduction process by ethylene glycol. In this second step, the platinum complex species deposited on VC are reduced to platinum particles by the reducing agent generated in situ at a temperature of over 100° C. through the following reactions:

Reaction Formula 4

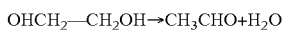

Reaction Formula 5

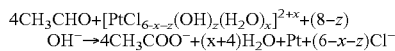

As apparent from Reaction Formulae 4 and 5, the size and dispersion of platinum particles produced in the reduction process depend heavily on those of the size and dispersion of the platinum complex species deposited on VC, thus on the amount of urea.

Figure 3:
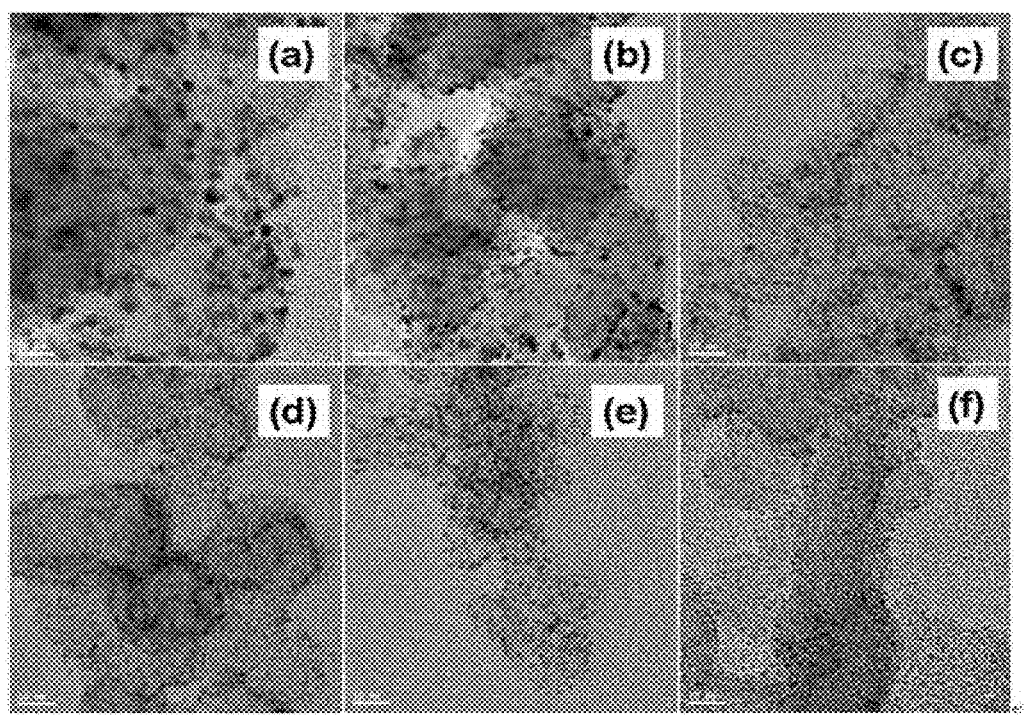
FIG. 3 (a) to (f) are high-resolution transmission electron microscopy (HRTEM) images of platinum complex species obtained by varying the addition amount of urea from 0 mg to 75 mg, 150 mg, 300 mg, 600 mg and 1,200 mg.
Figure 4:
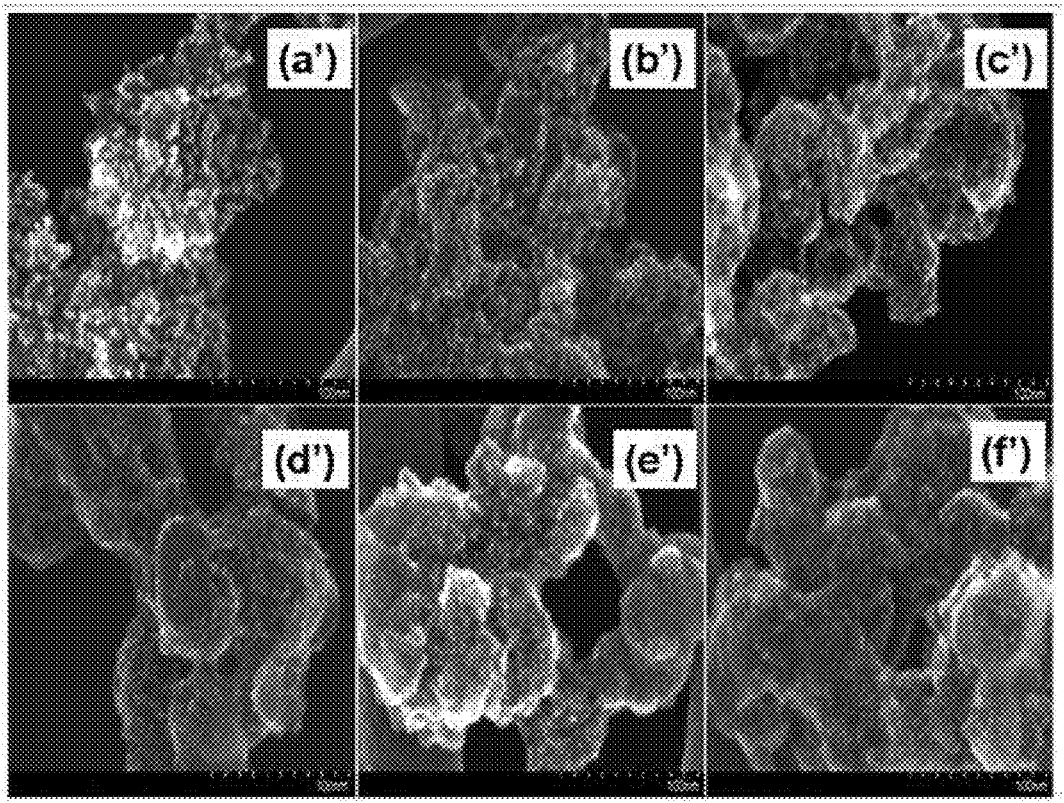
FIG. 4 (a') to (f') are high-resolution scanning electron microscopy (HRSEM) images of platinum particles obtained by varying the addition amount of urea from 0 mg to 75 mg, 150 mg, 300 mg, 600 mg and 1,200 mg.

Subsequently, the change of the acidity of the solution depending on the amount of urea and the size of the platinum complex species and platinum particles will be described referring to FIGS. 2 to 4.

Figure 2:
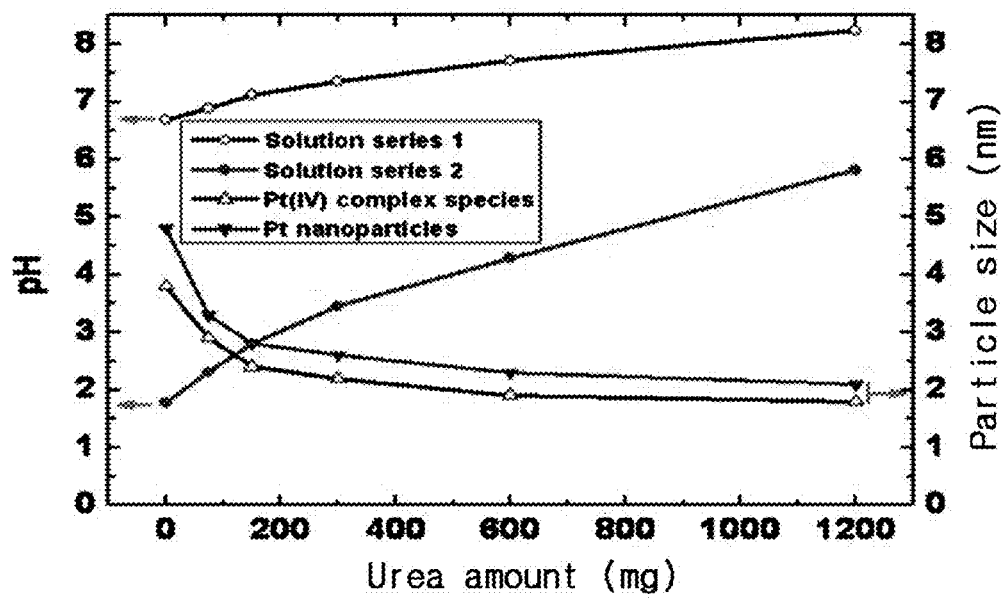
FIG. 2 shows acidity and size of platinum complex species and platinum particles versus addition amount of urea.

FIG. 2 shows the acidity and size of the platinum complex species and platinum particles for varying addition amounts of urea, with the amounts of platinum and the aqueous solution fixed at 48.8 mg and 200 mL, respectively. In FIG. 2, the pH values for solution series 1 were recorded in the VC slurry solutions in the absence of platinum salt after the hydrolysis of urea at 90-95° C. for 1-5 hour(s), while the pH values for solution series 2 were recorded in the presence of platinum salt under the same conditions. In both cases, pH values increase with increasing amount of urea. In the VC solution without addition of urea, the pH is about 6.68, and after addition of 1.2 g of urea, the pH of the VC solution increases to about 8.23. The increase in the amount of urea results in increased pH. In general, the catalyst precursor is stable at pH 7-11. The sizes of both the platinum complex species and platinum particles decrease as the addition amount of urea increases. This trend is also observed from the comparison of the electron microscopic images of FIGS. 3 and 4. FIG. 3 (a) to (f) are high-resolution transmission electron microscopy (HRTEM) images of the platinum complex species obtained by varying the addition amount of urea from 0 mg to 75 mg, 150 mg, 300 mg, 600 mg and 1,200 mg, and FIG. 4 (a') to (f') are high-resolution scanning electron microscopy (HRSEM) images of platinum particles obtained by varying the addition amount of urea from 0 mg to 75 mg, 150 mg, 300 mg, 600 mg and 1,200 mg. Referring to FIGS. 3 and 4, it can be seen that the sizes of the platinum complex species and platinum particles decrease with increasing addition amount of urea. In the absence of urea, the platinum complex species are much larger in size and agglomerate more as compared to when urea is added.

The decreasing size of the platinum complex species and platinum particles with increasing addition amount of urea may be explained by the following two factors. One of them is a steric contraction effect. The steric contraction effect results from the substitution of $H_2O$ and/or $Cl^-$ in $[PtCl_{6-x}(H_2O)_x]^{-2+x}$ by OH⁻, which has a smaller ionic radius, thus resulting in the smaller size of the platinum complex species and platinum particles. The other factor is an electrostatic charge effect, which can be explained as follows. The net charge of $[PtCl_{6-x}(H_2O)_x]^{-2+x}$ is calculated to be −1 if x=1 (i.e., in a very acidic solution, one $H_2O$ has been introduced into the platinum complex species), whereas at higher pH, $[PtCl_{6-x}(H_2O)_x]^{-2+x}$ can be converted to $[PtCl_{6-x}(OH)_y(H_2O)_{x-y}]^{-2+x-y}$, which has a net charge of −2 if y=1 and x=1 (i.e., one $H_2O$ in the former platinum complex species was replaced by one OH⁻). That is to say, the latter platinum complex species are more negatively charged than the former, and their growth is limited by the stronger electrostatic repulsion. Accordingly, only smaller and denser platinum complex species and platinum particles are formed.

Now, the change in the properties of Pt/VC prepared according to the present disclosure for different platinum loading amounts will be compared with those prepared by the existing methods.

Figure 5:
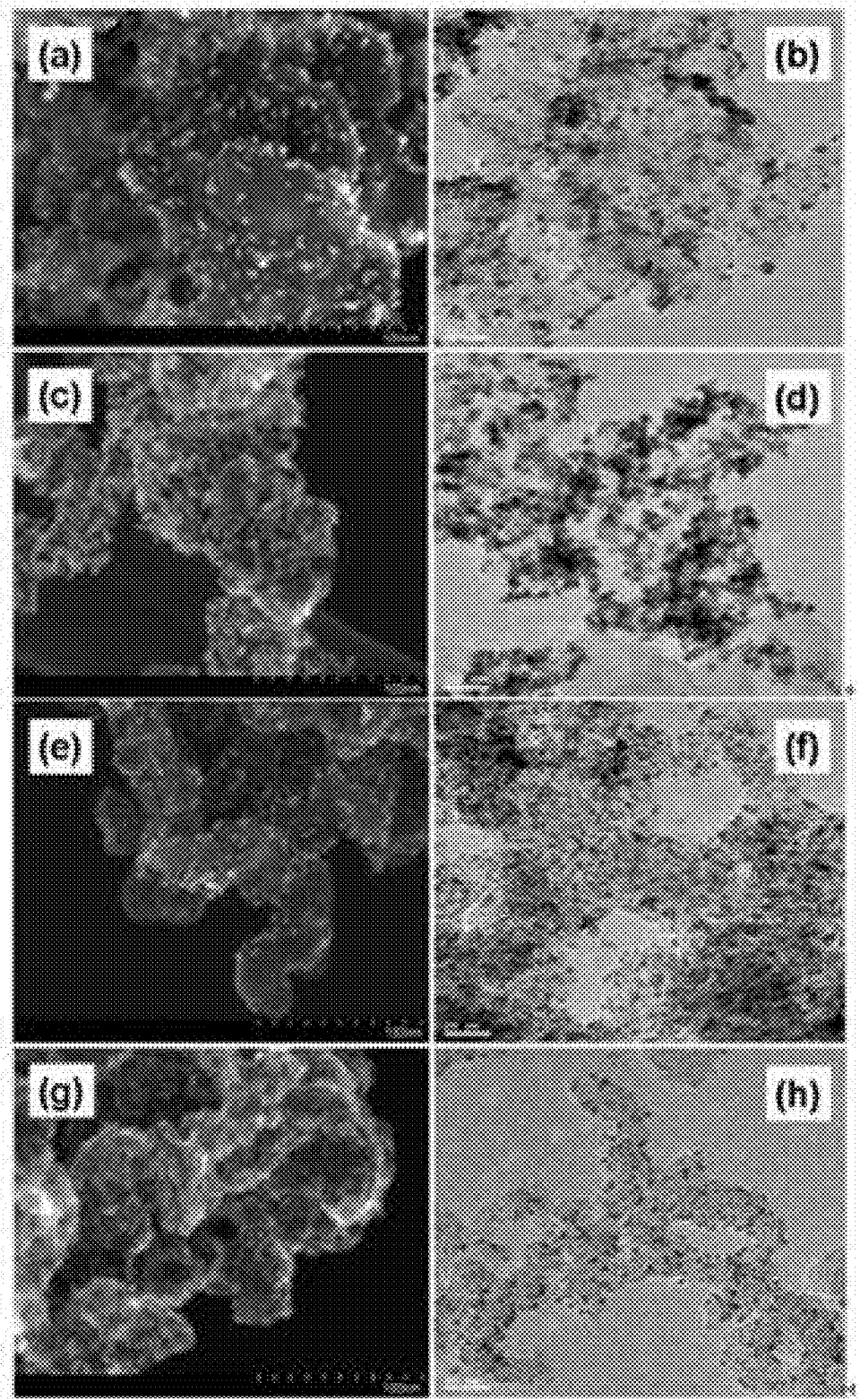
FIG. 5 shows HRSEM and HRTEM images of Pt/VC catalysts with a platinum loading amount of 60 wt % [Pt (60 wt %)/VC catalysts] prepared by sodium borohydride ($NaBH_4$) method, microwave-assisted EG (EG-MW) method and HD-EG method as well as Johnson Matthey (J.M.) commercial Pt (60 wt %)/VC catalyst.

FIG. 5 shows HRSEM and HRTEM images of Pt/VC catalysts with a platinum loading amount of 60 wt % prepared by sodium borohydride ($NaBH_4$) method, microwave-assisted ethylene glycol (EG-MW) method and HD-EG method as well as Johnson Matthey (J.M.) Pt (60 wt %)/VC catalyst. Specifically, the Pt/VC catalysts shown in FIG. 5 were prepared as follows.

For the $NaBH_4$ method, VC (32.5 mg) is added to distilled water (200 mL) and, after ultrasonication for 30 minutes, 0.05 M $H_2PtCl_6 \cdot 6H_2O$ aqueous solution (5 mL) is added. Then, 0.4 M KOH is added dropwise to adjust acidity to pH 7-9, and then $NaBH_4$ is added dropwise (the molar ratio of $NaBH_4$ to platinum is set at 10). After stirring overnight, the mixture is filtered and the catalyst residue is washed and then dried at 80° C. overnight. For the EG-MW method, VC (32.5 mg) is added to distilled water (200 mL) and, after ultrasonication for 30 minutes, 0.05 M $H_2PtCl_6 \cdot 6H_2O$ aqueous solution (5 mL) is added. Then, after stirring for 3 hours, ethylene glycol (200 mL) is added and then 0.4 M KOH is added dropwise to adjust acidity to pH 7-9. The resultant solution is heated in a household microwave oven for 5 minutes. After stirring overnight, the catalyst slurry is filtered and the resulting platinum catalyst is dried at 80° C. overnight. For the J.M. Pt/VC catalyst, a Pt/VC catalyst commercially available from Johnson Matthey with a platinum loading amount of 60 wt % is used.

Referring to FIG. 5, the HRSEM and HRTEM images of the Pt/VC catalyst prepared by the $NaBH_4$ method [(a), (b)] show larger platinum particles along with some particle agglomeration and broader size distribution compared with the one prepared by the HD-EG method [(g), (h)]. Thus, it can be seen that it is hard to control the particle size and distribution of platinum particles through the $NaBH_4$ method. In addition, a local pH increase in the solution results in uneven dispersion of the particles. For the EG-MW method [(c), (d)], the HRSEM and HRTEM images of the platinum particles show more uniform size and particle dispersion, although the particle size is slightly larger than that of the catalyst produced by the $NaBH_4$ method. This may be attributable to in situ generation of reducing agent through the reaction shown in Reaction Formula 4. As for the commercial J.M. catalyst [(e), (f)], the HRSEM and HRTEM images show smaller platinum particles compared with the catalysts prepared by the $NaBH_4$ method or by the EG-MW method. However, the J.M. catalyst still shows larger platinum particles, broader particle size distribution, and more agglomeration as compared with the catalyst synthesized by the HD-EG method [(g), (h)], which allows the in situ generation of $OH^-$ and in situ generation of reducing agent. In situ generation of $OH^-$ enables the platinum complex species to deposit homogeneously with uniform size on the VC support, while in situ generation of reducing agent enables the reduction of the platinum complex species deposited on VC to take place simultaneously, which may not be achieved in the $NaBH_4$ method or the EG-MW method where a reducing agent is introduced externally.

Figure 6:
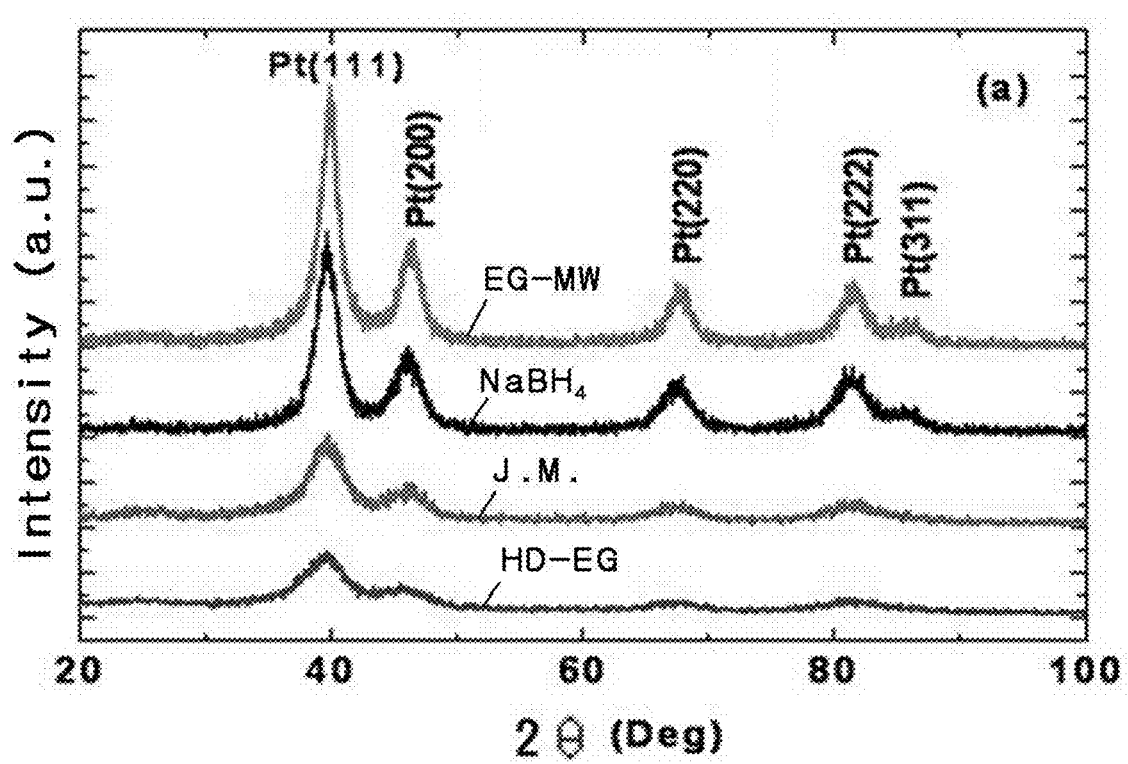
FIG. 6 shows X-ray diffraction (XRD) patterns of Pt (60 wt %)/VC catalysts prepared by $NaBH_4$ method, EG-MW method and HD-EG method and J.M. Pt (60 wt %)/VC catalyst.

As described above, due to the one-pot reduction, the HD-EG method of the present disclosure allows the synthesis of catalysts with high platinum loading of 60 wt %, still possessing small platinum particle size and uniform particle distribution, which is also confirmed by X-ray diffraction (XRD) analysis. FIG. 6 shows XRD patterns of Pt (60 wt %)/VC catalysts prepared by the $NaBH_4$ method, the EG-MW method and the HD-EG method and J.M. method Pt (60 wt %)/VC catalyst. Referring to FIG. 6, the average platinum particle sizes calculated from the XRD data are 4.1 nm for the $NaBH_4$ method, 4.3 nm for the EG-MW method, 3.2 nm for the commercially available J.M. catalyst, and 2.8 nm for the HD-EG method. This result is in good agreement with FIG. 5. When considering the activity of the Pt/VC catalyst, a desired average particle size of platinum particles deposited on the carbon support is 1-5 nm.

Figure 7:
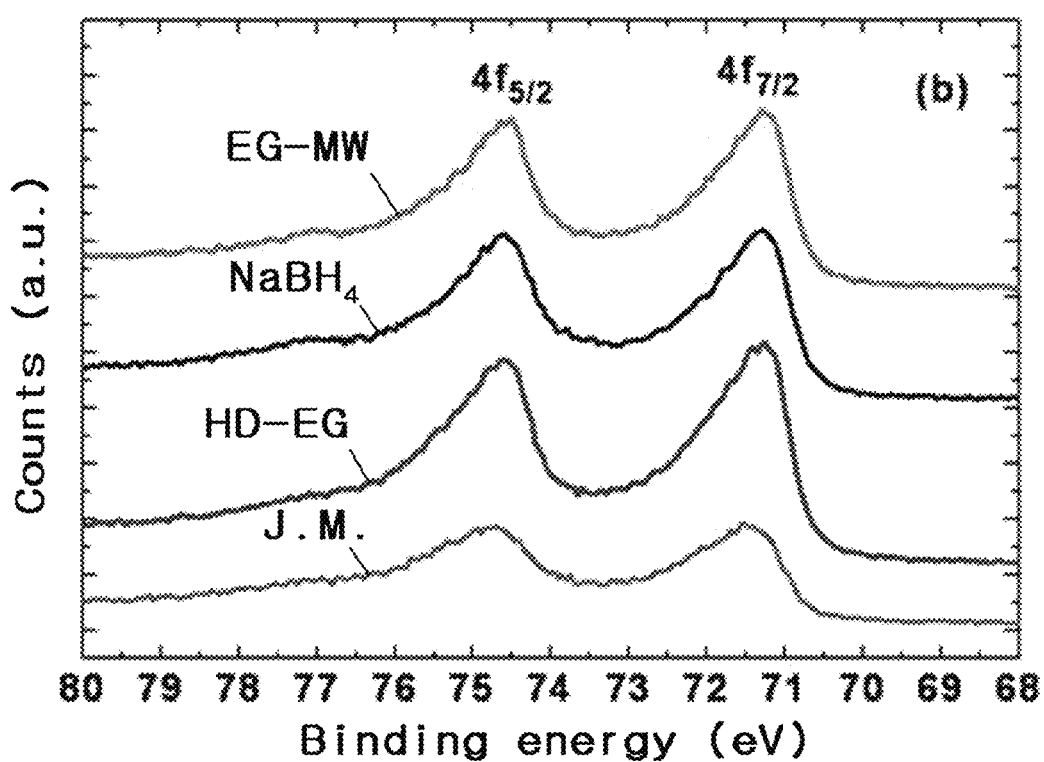
FIG. 7 shows x-ray photoelectron spectroscopy (XPS) spectra of Pt (60 wt %)/VC catalysts prepared by $NaBH_4$ method, EG-MW method and HD-EG method and J.M. Pt (60 wt %)/VC catalyst.

FIG. 7 shows x-ray photoelectron spectroscopy (XPS) spectra of Pt (60 wt %)/VC catalysts prepared by the $NaBH_4$ method, the EG-MW method, the J.M. method and the HD-EG method. The doublet peaks observed at 71.3 eV (71.5 eV for the J.M. catalyst) and 74.6 eV (74.8 eV for the J.M. catalyst) are attributable to $4f_{7/2}$ and $4f_{5/2}$ orbitals of platinum, respectively, implying that the dominant valences of the platinum species in the catalysts are 0.

Figure 8:
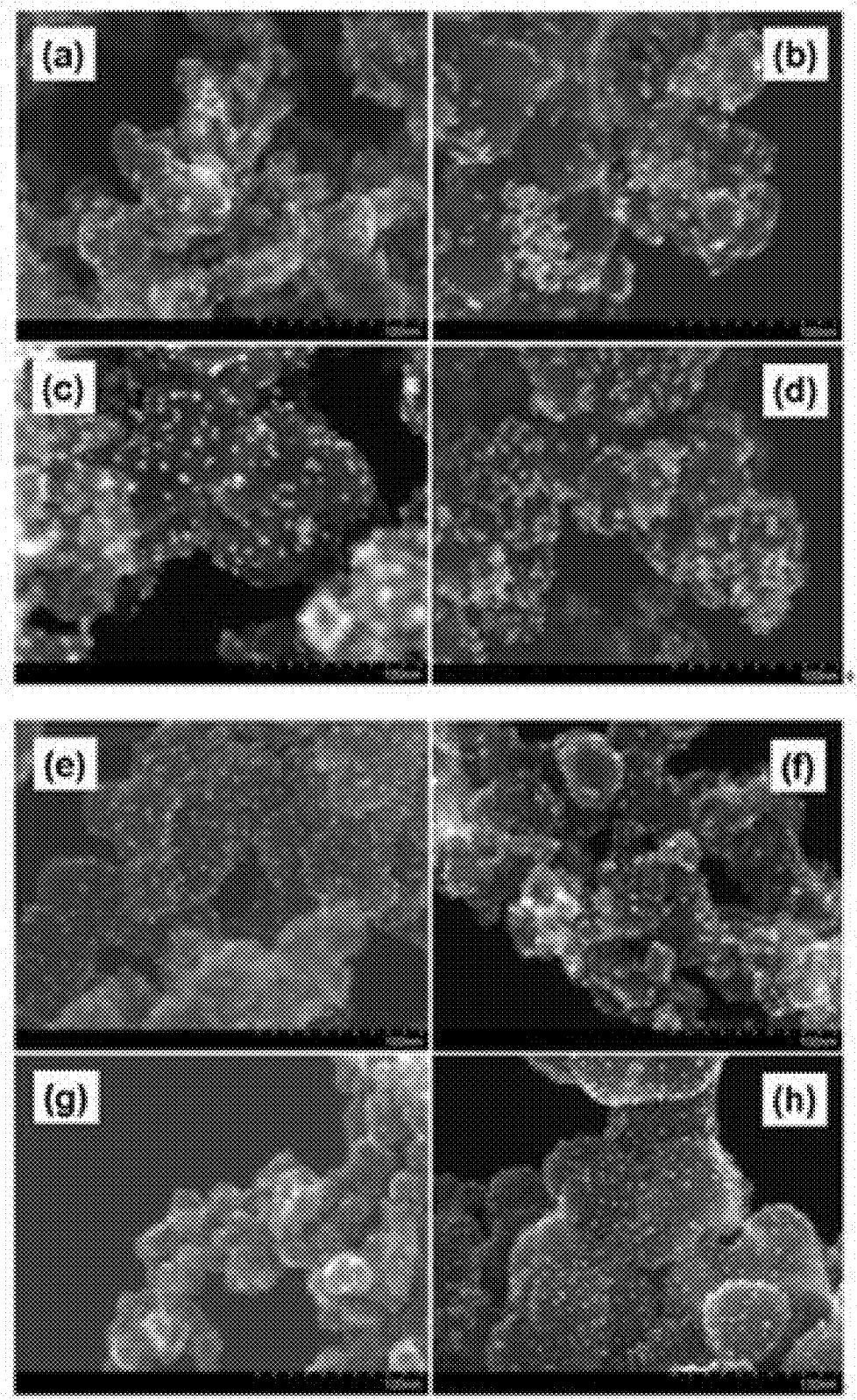
FIG. 8 shows HRSEM images of Pt/VC catalysts with a platinum loading amount of 20 wt % and 40 wt % prepared by $NaBH_4$ method, EG-MW method and HD-EG method and J.M Pt/VC catalyst.

FIG. 8 shows HRSEM images of Pt/VC catalysts with a platinum loading amount of 20 wt % and 40 wt % prepared by the $NaBH_4$ method [(a), (b)], the EG-MW method [(c), (d)] and the HD-EG method [(g), (h)) and the J.M. Pt/VC catalysts [(e), (f)] with a platinum loading amount of 20 wt % and 40 wt %. Referring to FIG. 8, with identical platinum loading, platinum particles are basically isolated from each other and show much smaller size with uniform distribution in the Pt/VC catalysts prepared by the HD-EG method compared with the ones made by other methods. Particularly, the slightest increase in the size of platinum particles is observed for the HD-EG method when the platinum loading is increased from 20 wt % to 40 wt %, indicating that the HD-EG method enables the synthesis of Pt/VC catalysts with superior properties particularly in the case of high platinum loading.

Figure 9:
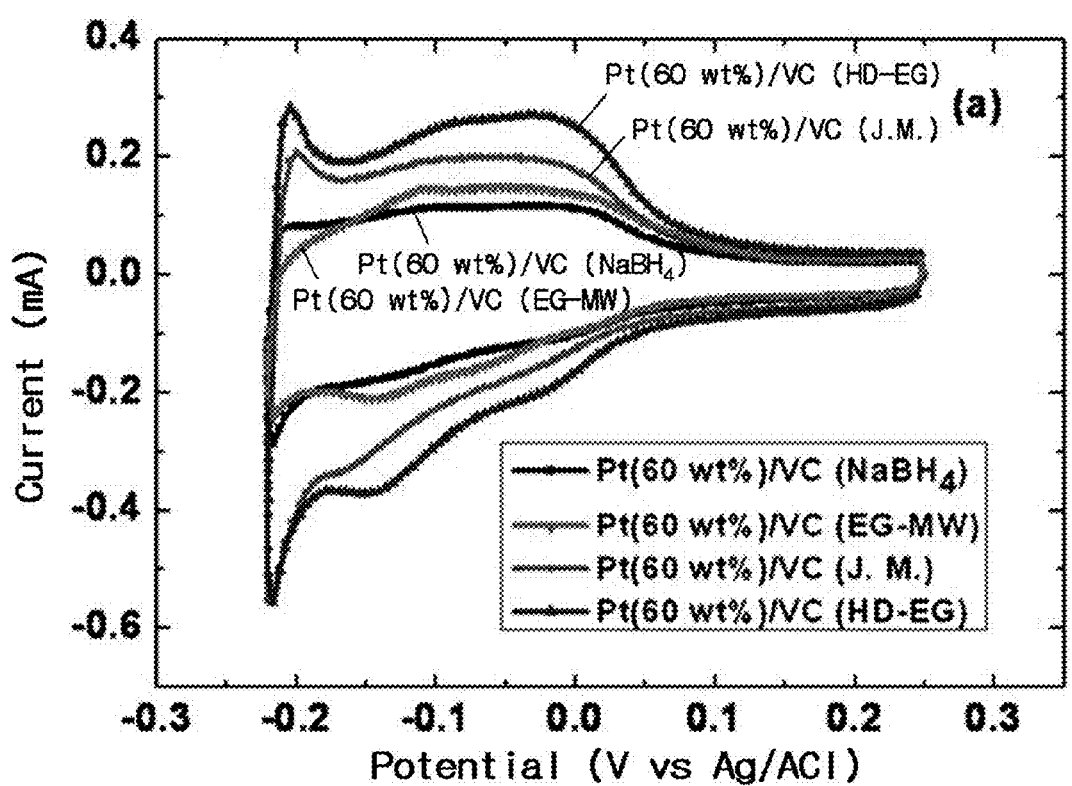
FIG. 9 shows hydrogen electrosorption profiles of Pt (60 wt %)/VC catalysts prepared by $NaBH_4$ method, EG-MW method and HD-EG method and J.M. Pt (60 wt %)/VC catalyst in aqueous 0.5 M sulfuric acid solutions.

An essential and informative parameter reflecting the catalyst property is utilization efficiency, which can be calculated by dividing the electrochemical active surface area (ECSA) by the chemical surface area (CSA). FIG. 9 shows hydrogen electrosorption profiles of Pt (60 wt %)/VC catalysts prepared by the $NaBH_4$ method, the EG-MW method, the J.M. method and the HD-EG method in aqueous 0.5 M sulfuric acid solutions. Referring to FIG. 9, well-defined hydrogen adsorption/desorption characteristics are observed for the Pt (60 wt %)/VC catalysts. A weak adsorption peak in the potential range from +0.05 to −0.1 V and a strong adsorption peak located between −0.1 and −0.2 V are observed during the negative-going potential scan, which are assigned to weakly and strongly bonded hydrogen adatoms, respectively. The corresponding desorption peaks are observed during the reverse potential scan. The ECSA of platinum is determined to be 78 $m^2g^{-1}$ for the Pt (60 wt %)/VC catalyst prepared by the HD-EG method, which is much larger than that of the catalysts produced by the $NaBH_4$ method (35 $m^2g^{-1}$), the EG-MW method (39 $m^2g^{-1}$) and the J.M. method (54 $m^2g^{-1}$), mainly resulting from the smaller platinum particle size and uniform particle distribution. The CSA can be calculated from the following equation: $CSA=6000/\rho d$, where $\rho$ represents density of platinum (21.4 $g\ cm^{-3}$) and d is the average diameter of platinum particles obtained from XRD analysis. The CSA is calculated as 68 $M^2g^{-1}$ for the $NaBH_4$ method, 65 $M^2g^{-1}$ for the EG-MW method, 88 $M^2g^{-1}$ for the J.M. method, and 100 $M^2g^{-1}$ for the HD-EG method. Thus, the corresponding utilization efficiency is 51%, 60%, 61% and 78% for the $NaBH_4$ method, the EG-MW method, the J.M. catalyst and the HD-EG method, respectively. The highest utilization efficiency of the HD-EG method may be attributable to the smaller platinum particles and the better particle dispersion, which enable more platinum particles to work as active sites for the desired reactions. As such, since the Pt/VC catalyst prepared by the HD-EG method according to the present disclosure exhibits high utilization efficiency, it will show high oxygen reduction reaction (ORR) activity and improved polarization performance in a proton exchange membrane fuel cell (PEMFC).

Measurement of polarization performance of a PEMFC may be performed as follows. A membrane electrode assembly with an area of 6.25 $cm^2$ is employed to construct a single cell, which has been fabricated by hot-pressing pretreated Nafion 112 (DuPont) between an anode and a cathode. The catalyst loading amount is 0.4 mg $Pt/cm^2$ at the anode and 0.2 mg $Pt/cm^2$ at the cathode. For all the tests, Pt (20 wt %)/VC (E-TEK) is used as anode catalyst, and the cathode catalyst is prepared according to the $NaBH_4$ method, the EG-MW method, the J.M. method or the HD-EG method. Catalyst inks are prepared by dispersing various Pt/VC catalysts into a mixture of distilled water and 5 wt % Nafion ionomer solution. The Nafion ionomer content is 25 wt % in the anode catalytic layer and 20 wt % in the cathode catalytic layer. The catalyst inks are painted uniformly on Teflon-treated carbon paper (TGPH-090) and dried at 80° C. overnight. Fuel cell polarization performance tests are conducted at 60° C. under constant current or constant voltage with a WFCTS fuel-cell test station. After the cell is humidified at 75° C., hydrogen and oxygen are supplied to the anode and the cathode at a flow rate of 200 $mL min^{-1}$ and 500 $mL min^{-1}$, respectively.

Figure 10:
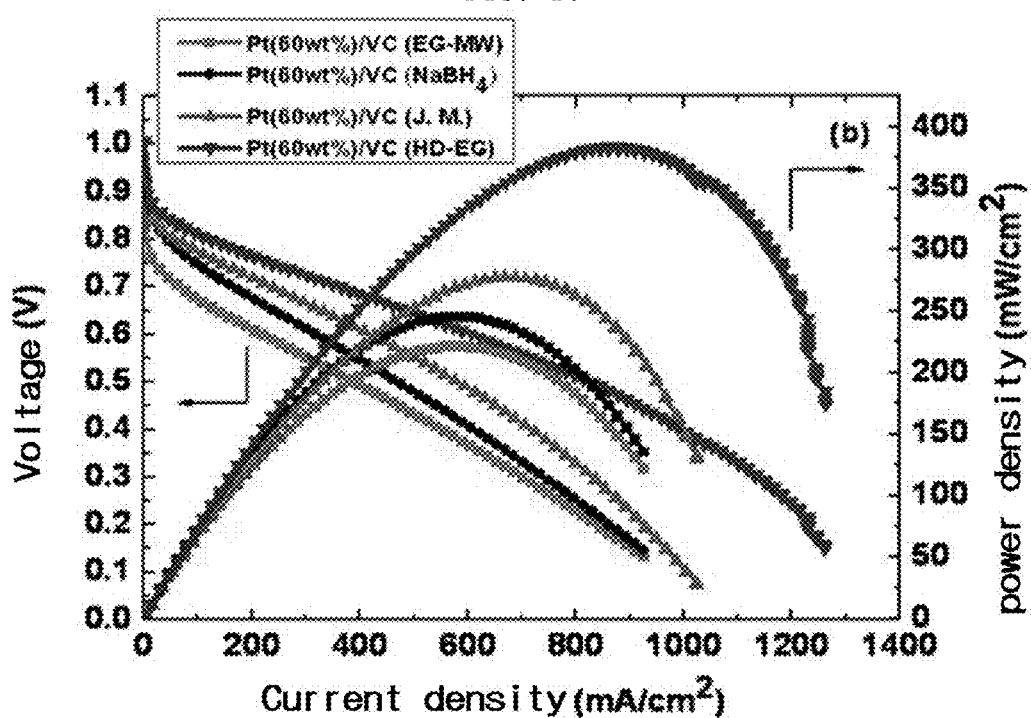
FIG. 10 shows polarization performance of proton exchange membrane fuel cells (PEMFCs) at 60° C. using various Pt (60 wt %)/VC catalysts.
Figure 11:
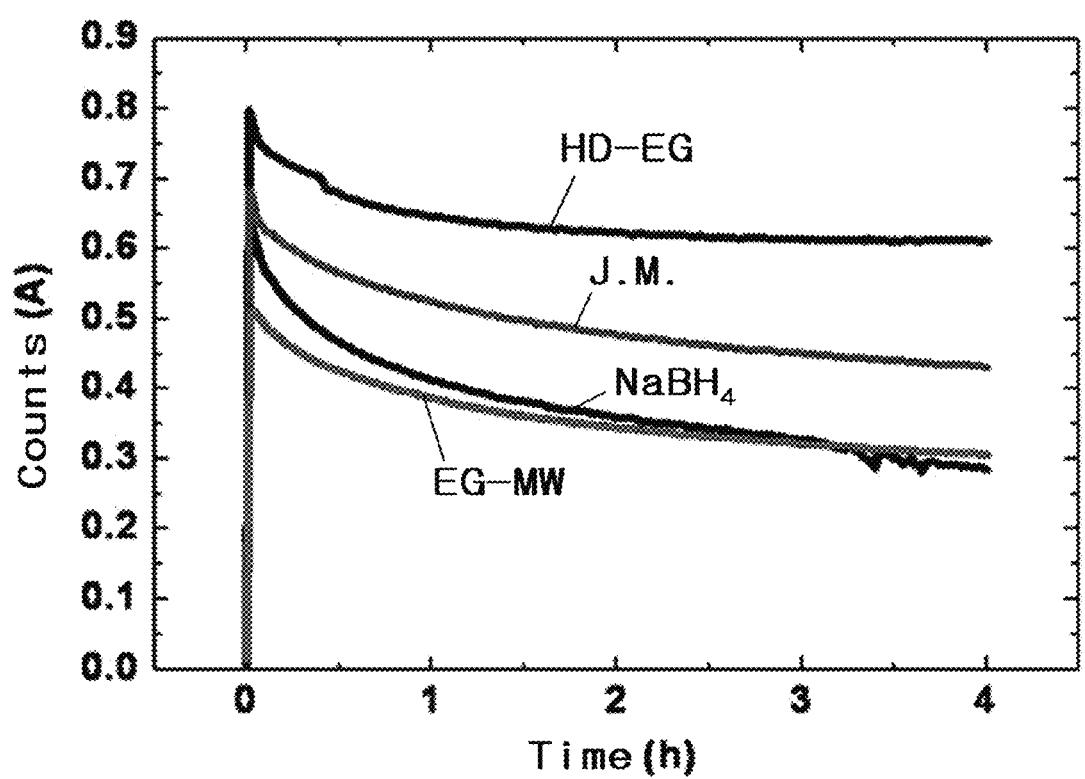
FIG. 11 shows chronoamperograms obtained at 0.75 V and 60° C. in oxygen-fed cathode mode for the PEMFCs using the various Pt (60 wt %)/VC catalysts.

FIG. 10 shows the polarization performance of the PEMFCs at 60° C. using various Pt (60 wt %)/VC catalysts. In principle, the polarization of a hydrogen-fueled fuel cell at low current density is electrochemical-activation-controlled and mainly attributed to the sluggish ORR at the cathode surface. The lowest loss in polarization voltage is observed for the HD-EG catalyst, which indicates the highest electrocatalytic activity toward ORR. The maximum power density is 384 $mWcm^{-2}$ for the HD-EG catalyst, which is much higher than that observed for the $NaBH_4$ method (245 $mWcm^{-2}$), the EG-MW method (230 $mWcm^{-2}$) and the J.M. catalyst (278 $mWcm^{-2}$). FIG. 11 shows chronoamperograms obtained at 0.75 V and 60° C. in oxygen-fed cathode mode for the PEMFCs using the various Pt (60 wt %)/VC catalysts. Referring to FIG. 11, the HD-EG catalyst shows the highest electrochemical stability. The higher catalytic activity and fuel cell polarization performance of the HD-EG catalyst are attributable to its larger ECSA and higher platinum utilization efficiency, both of which are closely related to the smaller platinum particles and more uniform particle dispersion on the VC surface.

Figure 12:
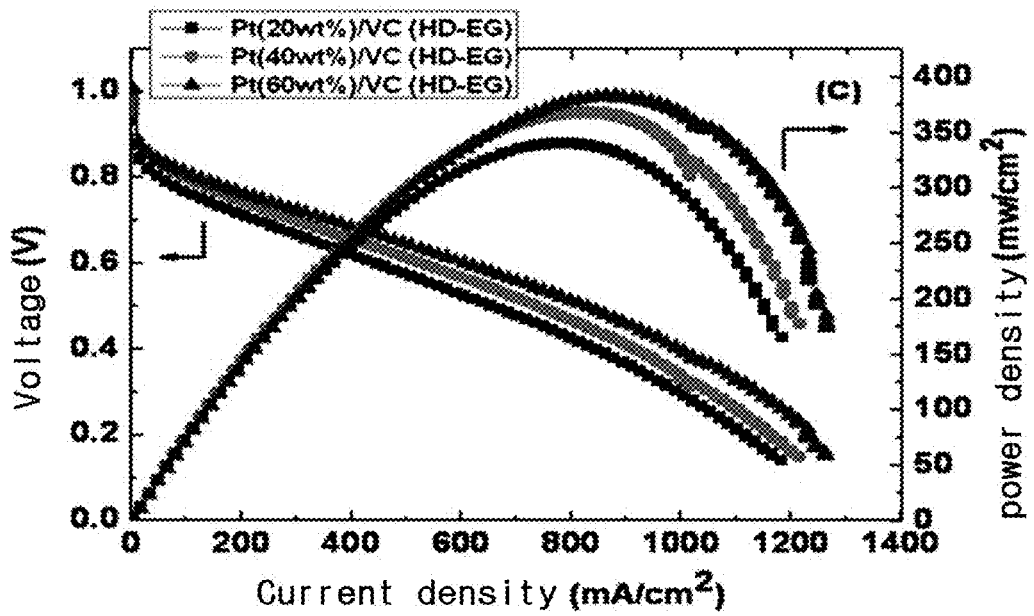
FIG. 12 shows PEMFC polarization performance of Pt/VC catalysts with various platinum loading amounts prepared by HD-EG method measured at 60° C.
Figure 13:
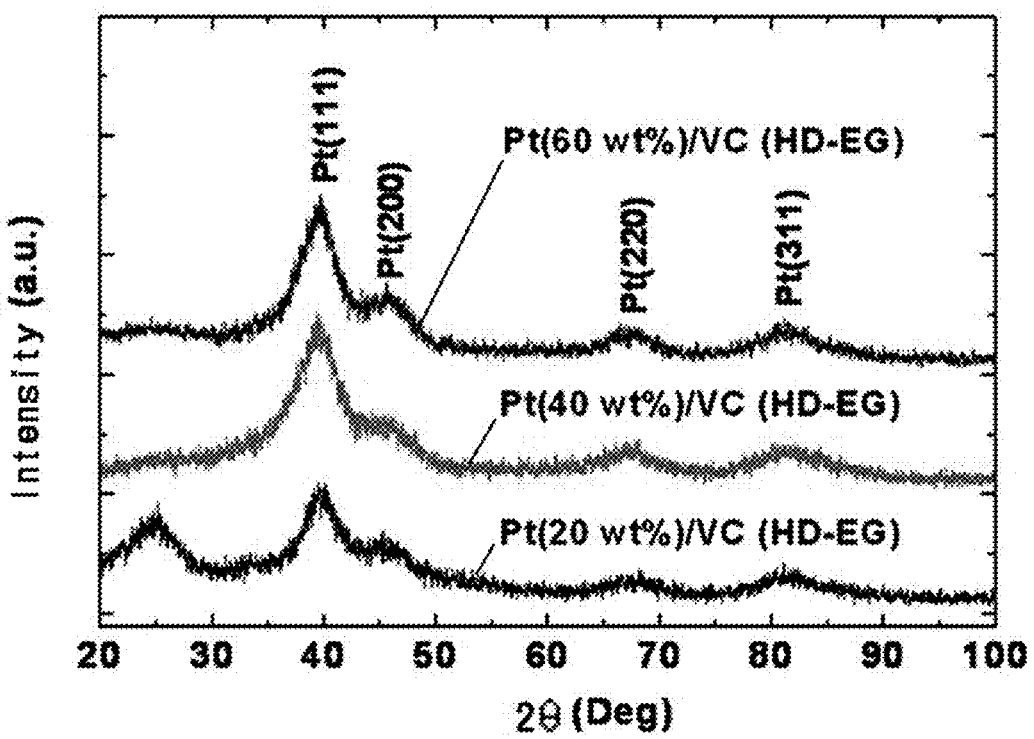
FIG. 13 shows XRD patterns of Pt/VC catalysts with various platinum loading amounts prepared by HD-EG method.

Generally, the polarization performance of a PEMFC degrades with increasing platinum loading on the catalyst, particularly at low catalyst loading density at the cathode. Similar trends are observed for the Pt/VC catalysts prepared by the $NaBH_4$ method, the EG-MW method and the J.M. Pt/VC catalyst. When platinum loading is varied from 20 to 60 wt %, the decrease in maximum power density observed is 22%, 29% and 20% for the $NaBH_4$, EG-MW and J.M. catalysts, respectively, which is mainly attributable to the considerable increase in the platinum particle size and worse particle distribution with the increase in loading amount, resulting in drastic decreases in the platinum ECSA and utilization efficiency. In contrast, the catalyst prepared by the HD-EG method according to the present disclosure shows a different trend as shown in FIG. 12. When the platinum loading increases from 20 to 60 wt %, the maximum power density increases by 12%. This may be explained as follows. Although the platinum loading of the HD-EG catalyst increases, the size of the platinum particles does not increase much. The XRD pattern shown in FIG. 13 reveal an average size of the platinum particles of 2.3 nm, 2.6 nm and 2.8 nm for platinum loadings of 20 wt %, 40 wt % and 60 wt %, respectively. Furthermore, the dispersion of the platinum particles on the VC surface remains highly homogeneous, even at platinum loading up to 60 wt %. The slight increase in the size of the platinum particles may result in a limited decrease in the catalytic activity due to the decreased platinum ECSA. However, the PEMFC polarization performance can be greatly improved due to the considerable reduction in the thickness of the cathode thanks to the decreased usage of the carbon support, facilitating fast mass transport and enhancing platinum utilization efficiency by aiding in the formation of the 3-phase interface. It is of particular importance that the platinum loading of 60 wt % provides enhanced fuel cell performance compared with 40 wt % or 20 wt %. In this case, the cost of fabricating the fuel cell can be lowered due to the reduced amount of the required catalyst support. Furthermore, the decrease in weight and size of the fuel cell stack not only provides high fuel cell efficiency but also extends applications of fuel cells.

In another embodiment, the present disclosure provides a method for preparing a platinum alloy/support catalyst, comprising: (a) dissolving a water-soluble salt of a metal having catalytic activity and urea in water and dispersing a support to prepare a dispersion solution; (b) stirring the resulting dispersion solution at high temperature to deposit metal hydroxide particles on the surface of the support; and (c) reducing the metal hydroxide particles deposited on the support.

In accordance with the present disclosure, metal hydroxide particles are homogeneously deposited on the support through reaction of hydroxide ions ($OH^-$) produced from hydrolysis of urea and active metal ions, and the metal hydroxide particles are efficiently and completely reduced. Thus, the resulting platinum alloy/support catalyst may have a high loading amount of the platinum alloy and the platinum alloy particles may have small size and uniform distribution. As a result, the activity of the catalyst may be improved.

In the step (a), a water-soluble salt of a metal is reacted with hydroxide ions produced from the hydrolysis of urea to prepare a dispersion solution for depositing metal hydroxide particles on a support. The water-soluble salt of a metal used in the step (a) may comprise one or more metal(s) selected from a group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce) and copper (Cu). A molar concentration of the metal salt may be about 0.5 to 2 mM, specifically about 1 mM, based on the total amount of the water included in the metal salt solution, the water included in the support slurry and the water included in other source. The aqueous solution of the metal salt is diluted to prevent agglomeration of the catalyst particles during the following deposition and reduction processes and thereby avoid increase in particle size and ensure perfect reduction. Prior to the deposition, the aqueous solution is acidic with about pH 3-4. Depending on situations, an alkali solution of, for example, NaOH or $NH_4OH$ may be added to adjust the pH. The metal may be loaded in an amount of 5-95 wt %, specifically 20-80 wt %, based on the total weight of the catalyst. The method of the present disclosure is economically favorable in that the expensive noble metal may be effectively utilized since small metal particles (2-3 nm) may be uniformly dispersed on the support surface. Furthermore, the relative weight proportion of the metal may be varied depending on applications. For example, an electrode catalyst of a fuel cell may be prepared relatively simply without resort to a complicated process and without using expensive reagents such as surfactants. The size and distribution of metal catalyst particles may be controlled by uniformly depositing metal hydroxide on the surface of a carbon support by adding the inexpensive deposition reagent urea and then completely reducing them using various reducing agents including hydrogen. This process is advantageous over the existing process for preparing an electrode catalyst of a fuel cell in cost and easiness of preparation. The deposition reagent urea may be used in excess moles, i.e. 5-200 equivalents, specifically 10-100 equivalents, based on the metal salt.

Also, in the present disclosure, the addition sequence of the water-soluble salt of the metal, urea and the support may be changed variously.

In an embodiment, the dissolution of the water-soluble salt of the metal may be followed by the dissolution of urea and the dispersion of the support. For example, after dissolving the water-soluble salt of the metal having catalytic activity in water to prepare an aqueous metal salt solution and dissolving urea in water to prepare an aqueous urea solution, the aqueous metal salt solution may be mixed with the aqueous urea solution. Finally, the support may be dispersed in the mixture solution of the aqueous metal salt solution and the aqueous urea solution. Alternatively, the dissolution of the water-soluble salt of the metal may be followed by the dispersion of the support and the dissolution of urea. For example, after dissolving the water-soluble salt of the metal having catalytic activity in water to prepare an aqueous metal salt solution and dissolving and dispersing the support in water to prepare a dispersion solution of the support, urea may be dissolved in the dispersion solution of the support. Finally, the dispersion solution of the support in which urea is dissolved may be mixed with the aqueous metal salt solution. During the process, stirring may be carried out to achieve uniform dissolution or dispersion. Through the stirring, the water-soluble salt of the metal may penetrate uniformly into the pores of the support. Also, depending on situations, an aqueous sodium hydroxide solution may be added to adjust adequately the pH before adding the water-soluble salt of the metal having catalytic activity. The pH adjustment using the aqueous sodium hydroxide solution may allow pH adjustment of the dispersion in a broader range than when only urea is used. As a result, a more uniform size distribution of the catalyst particles may be achieved.

The water-soluble salt of the metal used in the present disclosure may be a combination of two or more different species. When water-soluble salts comprising different metal atoms are used, alloy particles may be deposited on the support. The amount of the water-soluble salt of the metal is determined stoichiometrically depending on the relative amount of metal to be loaded on the support. The concentration of the salt in water may be determined depending on the solubility of the salt in water. The water-soluble salt of the metal used in the present disclosure may be hydrogen hexachloroplatinate(IV) or ruthenium chloride. Hydrogen hexachloroplatinate(IV) induces the generation of platinum hydroxide and ruthenium chloride induces the generation of ruthenium hydroxide. As a result, Pt—Ru alloy particles may be loaded on the support. The support has a lot of pores on the surface and inside thereof. The pores endow the support with a large surface area and allow a large amount of the metal catalyst particles to be loaded. The support used in the present disclosure may comprise at least one carbon support(s) selected from a group consisting of Vulcan carbon, carbon nanotube, carbon nanowire, carbon having a double porous structure and carbon capsule, or at least one selected from a group consisting of titanium dioxide, silica, aluminum oxide and manganese dioxide, or a composite of at least one selected from a group consisting of titanium dioxide, silica, aluminum oxide and manganese dioxide bonded to carbon.

In the step (b), the dispersion solution of the water-soluble salt of the metal, urea and the support is heated, so that the water-soluble salt of the metal reacts with hydroxide ions resulting from the hydrolysis of urea and metal hydroxide particles are deposited on the surface of the support. The hydrolysis of urea included in the dispersion solution generates hydroxide ions, so that the pH of the solution is maintained constant. Depending on situations, an aqueous sodium hydroxide solution may be added to adjust the pH. In accordance with the present disclosure, the preparation of a catalyst by HD is possible since the concentrations of hydroxide ions produced in the dispersion solution and the water-soluble salt of the metal are maintained uniform through the dispersion.

The properties of thus prepared catalyst are affected by the preparation process. If the pH of the dispersion solution is locally high or low, the reaction between the water-soluble salt of the metal and hydroxide ions may occur faster or slower depending on locations. In that case, the produced metal hydroxide particles do not have uniform size and the particle size cannot be maintained small. Furthermore, since the reduced metal particles partly maintain the shape of the metal hydroxide particles before reduction, the metal alloy/support catalyst prepared by HD according to the present disclosure may have improved size and uniformity of the metal particles and thus superior catalytic activity. The step (b) may be performed at 60-120° C. At a temperature lower than 60° C., the reaction may not occur well. And, at a temperature above 120° C., side reactions may occur.

An example of the chemical reaction occurring in the step (b) will be described for the case when the water-soluble salt of the metal is hydrogen hexachloroplatinate(IV).

In urea-assisted HD, hydroxide ions are produced according to Reaction Formula 1. They are produced by hydrolysis of urea. Since the supply of hydroxide ions occur in situ, the concentration of hydroxide ions in the solution may be maintained constant and an abrupt local change of pH may be avoided.

Reaction Formula 1

$$CO(NH_2)_2 + 3H_2O \rightarrow 2NH_4^+ + CO_2 + 2OH^-$$

In the solution in which urea is dissolved, hydrogen hexachloroplatinate(IV) is hydrated and exists as ion in the solution. It reacts with hydroxide ions to form metal hydroxide particles, which are uniformly deposited on the support. Since the concentration of hydroxide ions in the solution is constant, the produced hydroxide particles may have a uniform size. Reaction Formula 2 describes hydration of hydrogen hexachloroplatinate(IV), and Reaction Formula 3 describes production of metal hydroxide from reaction of hydrated platinum ion with hydroxide ion.

Reaction Formula 2

$$[PtCl_6]^{-2} + xH_2O \leftrightarrow [PtCl_{6-x}(H_2O)_x]^{-2+x} + xCl^- (x=0,1,2)$$

Reaction Formula 3

$$[PtCl_{6-x}(H_2O)_x]^{-2+x} + yOH^- \leftrightarrow [PtCl_{6-x}(OH)_y(H_2O)_{x-y}]^{-2+x-y} + yH_2O (x \geq y)$$

or $$[PtCl_{6-x}(H_2O)_x]^{-2+x} + zOH^- \leftrightarrow [PtCl_{6-x-z}(OH)_z(H_2O)_x]^{-2+x} + zCl^-$$

In the step (c), the metal hydroxide particles deposited on the support are reduced to metals. In this step, the reduction occurs under an appropriate reducing condition to ensure complete reduction of the metal hydroxide particles to metals. The reduction may be carried out in various ways. For example, the metal hydroxide particles may be reduced using a liquid reducing agent such as an aqueous solution of $NaBH_4$, $LiBH_4$, HCHO, HCOOH, $CH_3OH$, $CH_3CH_2OH$, HCOONa, $N_2H_4$ or $AlBH_4$ or ethylene glycol.

Also, the support with the metal hydroxide particles deposited may be treated at high temperature under hydrogen atmosphere to reduce the metal hydroxide particles. In this case, if the amount of the metal hydroxide particles loaded on the support is large as in the present disclosure, the metal hydroxide particles may be effectively reduced. The process requires the separation of the support with the metal hydroxide particles deposited from the dispersion solution. If the reaction of the step (b) is completed, the dispersion solution may be cooled to room temperature and the solid material in the form of slurry may be separated, washed with distilled water to remove remaining chloride, filtered, and then dried at high temperature. The heat treatment temperature may be 150-400° C. If the heat treatment temperature is below 150° C., reduction may not occur sufficiently. And, if the temperature is above 400° C., the metal particles may agglomerate.

As described above, the present disclosure provides an environment-friendly and cost-effective method for synthesizing a platinum alloy/support catalyst whereby the catalyst can be synthesized under a mild condition in an aqueous solution at low temperature. The metal loading amount of the platinum alloy/support catalyst may be controlled within a wide range of 5-95 wt % based on the total weight. In particular, a small size and a uniform size distribution of the metal particles may be achieved even with high metal loading. Accordingly, the platinum alloy/support catalyst of the present disclosure may greatly enhance catalytic activity of fuel oxidation reaction and fuel cell polarization performance when it is used as an electrode catalyst of a fuel cell.

EXAMPLES

The examples and experiments will now be described. The following examples and experiments are for illustrative purposes only and not intended to limit the scope of this disclosure.

Example 1-1

Preparation of Pt—Ru (60 wt %)/VC Catalyst (HD-H$_2$) at pH 7-8

Equimolar amounts of hydrogen hexachloroplatinate(IV) (Kojima) and ruthenium chloride (Aldrich) were dissolved in distilled water to prepare a metal salt solution. Vulcan carbon (VC) was separately dispersed in distilled water and stirred at room temperature for 30 minutes to prepare a VC dispersion solution. After adding urea (Aldrich) to the VC dispersion solution, the mixture was stirred until a homogeneous carbon-urea solution was obtained. Then, after mixing the metal salt solution with the carbon-urea solution and stirring, a slight amount of NaOH was added at room temperature to adjust the acidity of the solution to pH 7-8. After stirring for an hour, the mixture solution was heated to 90° C. and then allowed to stand alone after stirring for 1-10 hour. The molar ratio of urea to Pt—Ru was 20:1. Subsequently, the mixture solution was cooled to room temperature and the mixture slurry was washed repeatedly with distilled water and, filtered to remove remaining chloride, and then dried at 80° C. overnight. The dried slurry was loaded in a tube furnace and heat treated at 300° C. for 1 hour while supplying hydrogen. Thus prepared Pt—Ru/VC catalyst had a Pt—Ru loading amount of 60 wt %.

Example 1-2

Preparation of Pt—Ru (40 wt %)/VC Catalyst (HD-H$_2$) at pH 3-4

A Pt—Ru (40 wt %)/VC catalyst (HD-H$_2$) was prepared in the same manner as Example 1-1, except for not adding NaOH after addition of urea to the mixture solution of the metal salt solution and the VC dispersion solution (The molar ratio of urea to Pt—Ru was 20:1 and the acidity of the dispersion solution was pH 3-4.) and adjusting the Pt—Ru loading amount to 40 wt %.

Example 1-3

Preparation of Pt—Ru (40 wt %)/VC Catalyst (HD-H$_2$) at pH 5-6

A Pt—Ru (40 wt %)/VC catalyst (HD-H$_2$) was prepared in the same manner as Example 1-1, except for adding NaOH after addition of urea to the mixture solution of the metal salt solution and the VC dispersion solution (The molar ratio of urea to Pt—Ru was 20:1.), so that the acidity of the mixture solution was pH 5-6, and adjusting the Pt—Ru loading amount to 40 wt %.

Example 1-4

Preparation of Pt—Ru (40 wt %)/VC Catalyst (HD-H$_2$) at pH 7-8

A Pt—Ru (40 wt %)/VC catalyst (HD-H$_2$) was prepared in the same manner as Example 1-1, except for adding NaOH after addition of urea to the mixture solution of the metal salt solution and the VC dispersion solution (The molar ratio of urea to Pt—Ru was 20:1.), so that the acidity of the mixture solution was pH 7-8, and adjusting the Pt—Ru loading amount to 40 wt %.

Example 1-5

Preparation of Pt—Ru (40 wt %)/VC Catalyst (HD-H$_2$) at pH 9-10

A Pt—Ru (40 wt %)/VC catalyst (HD-H$_2$) was prepared in the same manner as Example 1-1, except for adding NaOH after addition of urea to the mixture solution of the metal salt solution and the VC dispersion solution (The molar ratio of urea to Pt—Ru was 20:1.), so that the acidity of the mixture solution was pH 9-10, and adjusting the Pt—Ru loading amount to 40 wt %.

Example 2

Preparation of Half Cell Using Pt—Ru (60 Wt %)/VC Catalyst (HD-H$_2$) of Example 1-1

In order to measure catalytic activity for methanol oxidation and electrochemical surface area of platinum, a half cell (three-electrode electrochemical cell) was prepared using the Pt—Ru (60 wt %)/VC catalyst of Example 1-1. Platinum gauze was used as counter electrode and Ag/AgCl as reference electrode. The working electrode was a thin layer of Nafion-impregnated catalyst cast on a glassy carbon disk of 3 mm diameter, and was immersed in an electrolyte in a Teflon cylinder along with the platinum gauze and the counter electrode. The working electrode was prepared according to *Appl. Catal. B: Environ.* 84 (2008) 100-105. The catalyst loading amount of the working electrode was 0.2 mg Pt/cm$^2$.

Example 3-1

Preparation of Single Cell Using Pt—Ru (60 wt %)/VC Catalyst (HD-H$_2$) of Example 1-1

For evaluation of fuel cell polarization performance, a single cell with a cross-sectional catalyst area of 2 cm$^2$ was constructed using the Pt—Ru (60 wt %)/VC catalyst of Example 1-1. A membrane electrode assembly (MEA) was fabricated by hot-pressing (135° C., 2000 psi, 5 minutes) a pretreated Nafion-115 membrane (DuPont) between an anode and a cathode. The anode and the cathode had been prepared by printing catalytic inks on Teflon-coated carbon paper (TGPH-090) and drying in an oven at 70° C. for 1 hour. The catalyst inks had been prepared by dispersing the catalyst (100 mg) in 5 wt % Nafion solution (0.763 mL) and then stirring. The catalyst loading amount was 3.0 mg Pt—Ru/cm$^2$ at the anode and 5.0 mg Pt/cm$^2$ at the cathode (platinum catalyst prepared by the Johnson Matthey method). A 2.0 M methanol solution was supplied to the anode at a rate of 1.5 mL/min using a Masterflex liquid micro-pump, and dried oxygen was supplied to the cathode at a controlled rate of 100 cc/min using a flow meter.

Example 3-2

Preparation of Single Cell Using Pt—Ru (40 wt %)/VC Catalyst (HD-H$_2$) of Example 1-2

A single cell was prepared in the same manner as Example 3-1, except for using the Pt—Ru (40 wt %)/VC catalyst (HD-H$_2$) of Example 1-2.

Example 3-3

Preparation of Single Cell Using Pt—Ru (40 wt %)/VC Catalyst (HD-H$_2$) of Example 1-3

A single cell was prepared in the same manner as Example 3-1, except for using the Pt—Ru (40 wt %)/VC catalyst (HD-H$_2$) of Example 1-3.

Example 3-4

Preparation of Single Cell Using Pt—Ru (40 wt %)/VC Catalyst (HD-H$_2$) of Example 1-4

A single cell was prepared in the same manner as Example 3-1, except for using the Pt—Ru (40 wt %)/VC catalyst (HD-H$_2$) of Example 1-4.

Example 3-5

Preparation of Single Cell Using Pt—Ru (40 wt %)/VC Catalyst (HD-H$_2$) of Example 1-5

A single cell was prepared in the same manner as Example 3-1, except for using the Pt—Ru (40 wt %)/VC catalyst (HD-H$_2$) of Example 1-5.

Comparative Example 1-1

Preparation of Pt—Ru (60 wt %)/VC Catalyst (NaBH$_4$)

A Pt—Ru/VC catalyst having a catalyst loading amount the same as that of Example 1-1 was prepared using NaBH$_4$ as a reducing agent. Specifically, the catalyst was prepared according to *Appl. Catal. B: Environ.* 84 (2008) 100-105.

Comparative Example 1-2

Preparation of Pt—Ru (40 wt %)/VC Catalyst (NaBH$_4$)

A Pt—Ru (40 wt %)/VC catalyst (NaBH$_4$) was prepared in the same manner as Comparative Example 1-1, except for changing the catalyst loading amount to 40 wt %.

Comparative Example 2

Preparation of Half Cell Using Pt—Ru (60 wt %)/VC Catalyst (NaBH$_4$)

A half cell was prepared in the same manner as Example 2, except for using the Pt—Ru (60 wt %)/VC catalyst (NaBH$_4$) of Comparative Example 1-1 for the working electrode.

Comparative Example 3-1

Preparation of Single Cell Using Pt—Ru (60 wt %)/VC Catalyst (NaBH$_4$)

A single cell was prepared in the same manner as Example 3-1, except for using the Pt—Ru (60 wt %)/VC catalyst (NaBH$_4$) of Comparative Example 1-1 at the anode.

Comparative Example 3-2

Preparation of Single Cell Using Pt—Ru (40 wt %)/VC Catalyst (NaBH$_4$)

A single cell was prepared in the same manner as Example 3-1, except for using the Pt—Ru (40 wt %)/VC catalyst (NaBH$_4$) of Comparative Example 1-2 at the anode.

Test Example 1

Observation of Surface by HRTEM

The surface of the Pt—Ru (60 wt %)/VC catalyst was observed using a high-resolution transmission electron microscope (HRTEM). HRTEM images were obtained using an FE-2010 microscope (JEOL) operated at 200 kV.

FIG. 14 shows the HRTEM images of the nanoparticles of Example 1-1 and Comparative Example 1 and size and distribution of the nanoparticles of Example 1-1. Referring to FIG. 14 (*a*), the Pt—Ru (60 wt %)/VC catalyst (HD-H$_2$) of Example 1-1 are observed as small and spherical uniform black dots uniformly distributed on the VC support. Referring to FIG. 14 (*c*), the Pt—Ru nanoparticles loaded on the Pt—Ru (60 wt %)/VC catalyst (HD-H$_2$) of Example 1-1 had a particle size distribution of 1.7-3.3 nm and average particle size was 2.6 nm. Referring to FIG. 14 (*b*), the Pt—Ru (60 wt %)/VC catalyst (NaBH$_4$) of Comparative Example 1-1 showed larger Pt—Ru particles and worse distribution as compared to Example 1-1. Pt—Ru particle size distribution was 2.3-5.7 nm and average particle size was 3.8 nm.

Test Example 2

XRD Analysis

Figure 15:
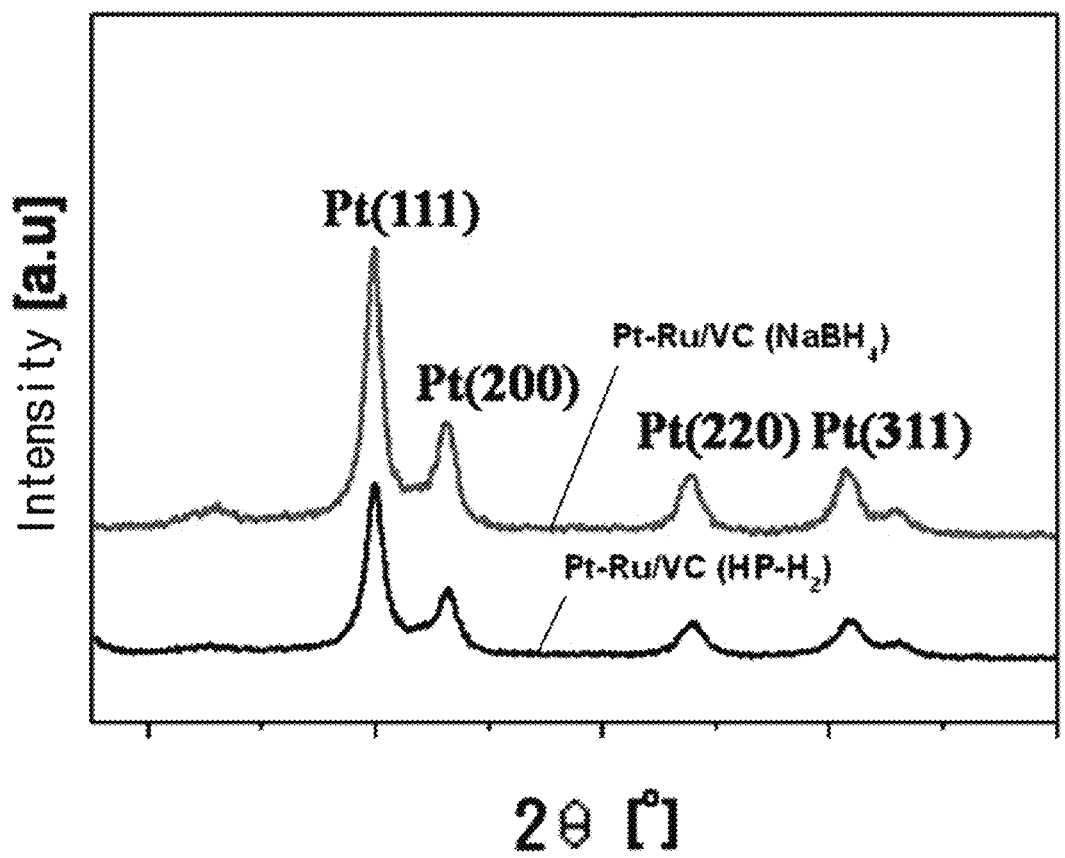
FIG. 15 shows XRD patterns of Pt—Ru (60 wt %)/VC catalysts of Example 1-1 and Comparative Example 1.

X-ray diffraction (XRD) patterns were obtained using a Rigaku diffractometer using Cu Kα radiation under the condition of 40 kV and 20 mA, at a scan rate of 4°/min. FIG. 15 shows the XRD patterns of the Pt—Ru (60 wt %)/VC catalysts of Example 1-1 and Comparative Example 1. Referring to FIG. 15, the peak observed at 24.5° is the carbon support peak. At 2θ=39.8°, 67.8° and 81.2°, face-centered cubic (fcc) crystalline platinum (111), (220) and (311) peaks are observed, respectively. This result reveals that the alloy catalyst has a single-phase random structure. With respect to bulk platinum, the Pt—Ru alloy catalyst shows a slight upward shift of the 2θ value, indicating that ruthenium atoms are inserted between platinum atoms to form the alloy. The peak shifts to 41.0°, 68.9° and 83.6° confirm the formation of the Pt—Ru alloy. The particle sizes of the metal alloys calculated using the Scherrer equation shows a good agreement with the HRTEM images of FIG. 14, with 2.7 nm and 3.7 nm for Example 1-1 and Comparative Example 1-1, respectively.

Test Example 3

TGA Analysis

Figure 16:
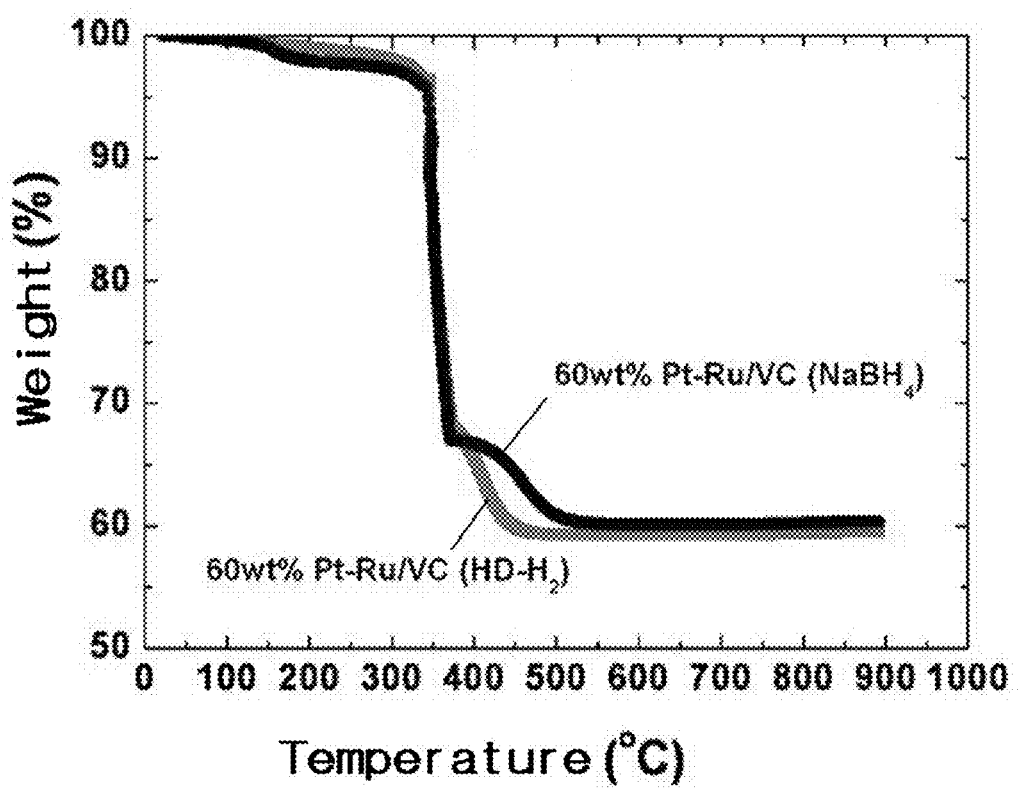
FIG. 16 shows thermogravimetric analysis (TGA) curves of catalysts of Example 1-1 and Comparative Example 1.

Thermogravimetric analysis (TGA) was carried out for the Pt—Ru (60 wt %)/VC catalysts of Example 1-1 and Comparative Example 1-1. FIG. 16 shows TGA curves of the catalysts of Example 1-1 and Comparative Example 1. The alloy content of the both catalysts of Example 1-1 and Comparative Example 1-1 was measured at 60 wt %, and it was confirmed that all the platinum and ruthenium ions had been completely reduced to platinum and ruthenium metals.

Test Example 4

Cyclic Voltammetric Measurement

Cyclic voltammetric measurement was carried out using the half cells of Example 2 and Comparative Example 2. The cyclic voltammetric measurement was conducted at room temperature in 0.5 M sulfuric acid with a scan rate of 25 mV/s. Prior to the measurement, the electrolyte solution was deaerated by flowing high-purity nitrogen for 1 hour. Stable voltammograms were recorded after 10 cycles. Electrochemical active surface area (ECSA) is an important measure representing the intrinsic electrochemical activity of platinum-based catalysts. It can be calculated from the integrated charge in the hydrogen adsorption region of the steady-state cyclic voltammogram in the supporting electrolyte (i.e., 0.5 M $H_2SO_4$), based on a monolayer hydrogen adsorption charge (0.21 $mC/cm^2$) on polycrystalline platinum.

Figure 17:
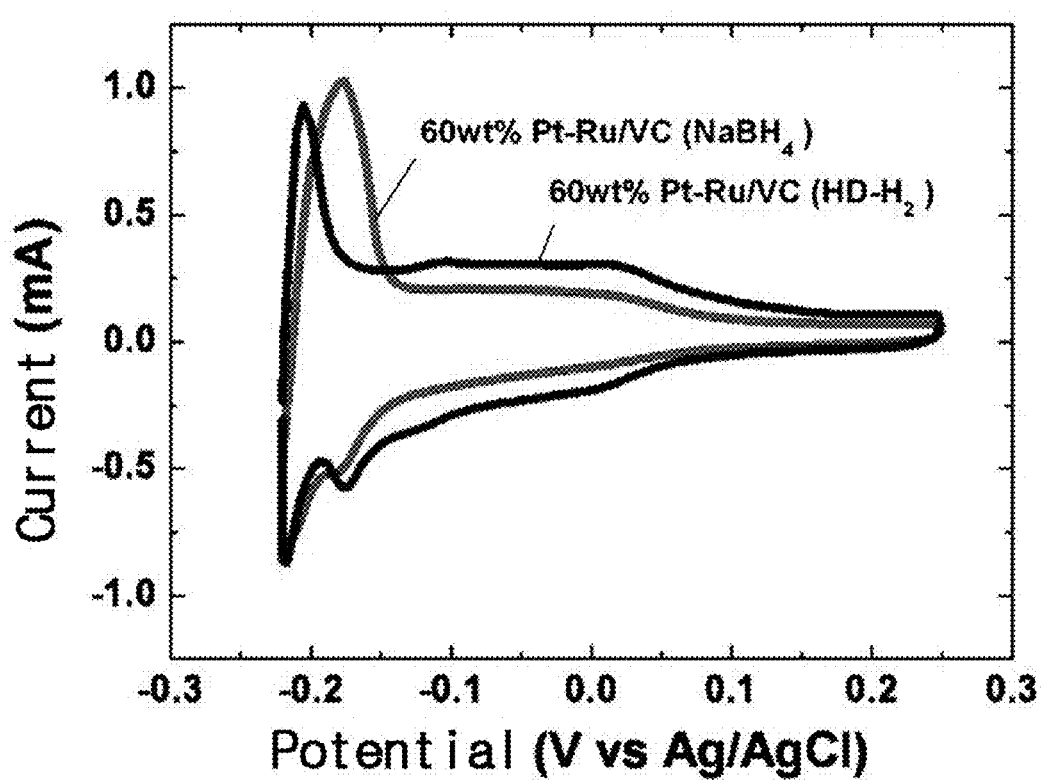
FIG. 17 shows hydrogen electrosorption profiles obtained using half cells of Example 2 and Comparative Example 2.

FIG. 17 shows hydrogen electrosorption profiles obtained using the half cells of Example 2 and Comparative Example 2. Referring to FIG. 17, for the half cell of Example 2, a weak adsorption peak was observed in the potential range from +0.05 to −0.1 V and a strong adsorption peak was observed in the potential range from −0.1 to −0.2 V during the negative-going potential scan, which are assigned to weakly and strongly bonded hydrogen adatoms, respectively. The ECSA of platinum was measured as 59 $m^2/g$ for Example 2, which is larger than that of Comparative Example 2 (36 $m^2/g$). This reveals that the catalyst of Example 2 has higher efficiency than that of Comparative Example 2 because of smaller size and more uniform dispersity of the Pt—Ru nanoparticles.

Test Example 5

Cyclic Voltammetric Measurement

Figure 18:
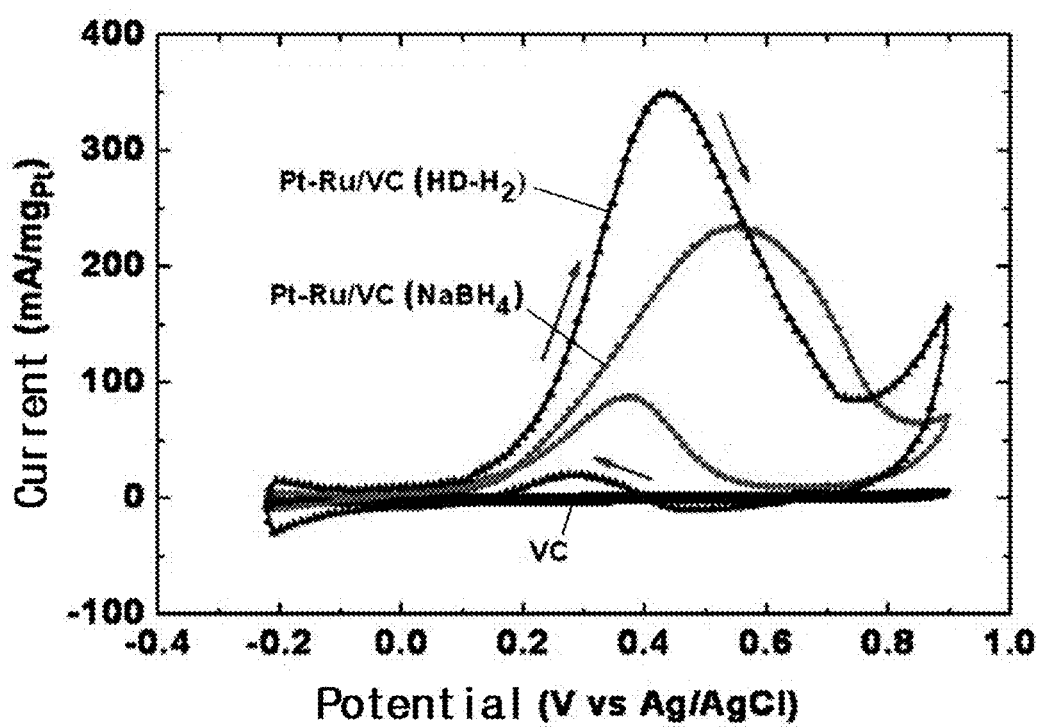
FIG. 18 shows cyclic voltammograms showing catalytic activity for methanol oxidation measured under 1.0 M methanol and 0.5 M sulfuric acid condition.

Another cyclic voltammetric measurement was carried out using the half cells of Example 2 and Comparative Example 2. FIG. 18 shows cyclic voltammograms showing catalytic activity for methanol oxidation measured under 1.0 M methanol and 0.5 M sulfuric acid condition. Referring to FIG. 18, the potential at which methanol oxidation begins is 0.5 V for Example 2 with respect to the Ag/AgCl electrode, which is lower than that of Comparative Example 2 (0.1 V). In addition, the former catalyst exhibits much higher peak current and lower oxidation peak potential during the forward scan. The ratio of the current density of the anode peaks during the forward scan ($I_f$) and the backward scan ($I_b$) is an important measure of the catalyst's resistance to carbon monoxide (CO). A small $I_f/I_b$ value implies that methanol is not oxidized well to carbon monoxide and carbon materials are excessively accumulated on the catalyst surface, which may lead to carbon monoxide contamination. Referring to Table 1, Example 2 shows much larger $I_f/I_b$ value than Comparative Example 2, indicating higher resistance to carbon monoxide. Specific mass activity measured at 0.4 V was 335 $mA/mg_{Pt}$ for Example 2 and 165 $mA/mg_{Pt}$ for Comparative Example 2. To conclude, Example 2 shows better catalytic activity for methanol oxidation than Comparative Example 2, presumably because of smaller size and more uniform distribution of metal nanoparticles of the electrode catalyst of Example 2.

TABLE 1

| Catalyst | ECSA ($m^2/g$) | Onset potential (V) | Specific mass activity ($mA/mg_{Pt}$) | $I_f/I_b$ |
|---|---|---|---|---|
| Pt—Ru/VC (NaBH$_4$) | 36 | 0.10 | 165 | 2.67 |
| Pt—Ru/VC (HD-H$_2$) | 59 | 0.05 | 335 | 17.11 |

Test Example 6

Evaluation of Polarization Performance

Figure 19:
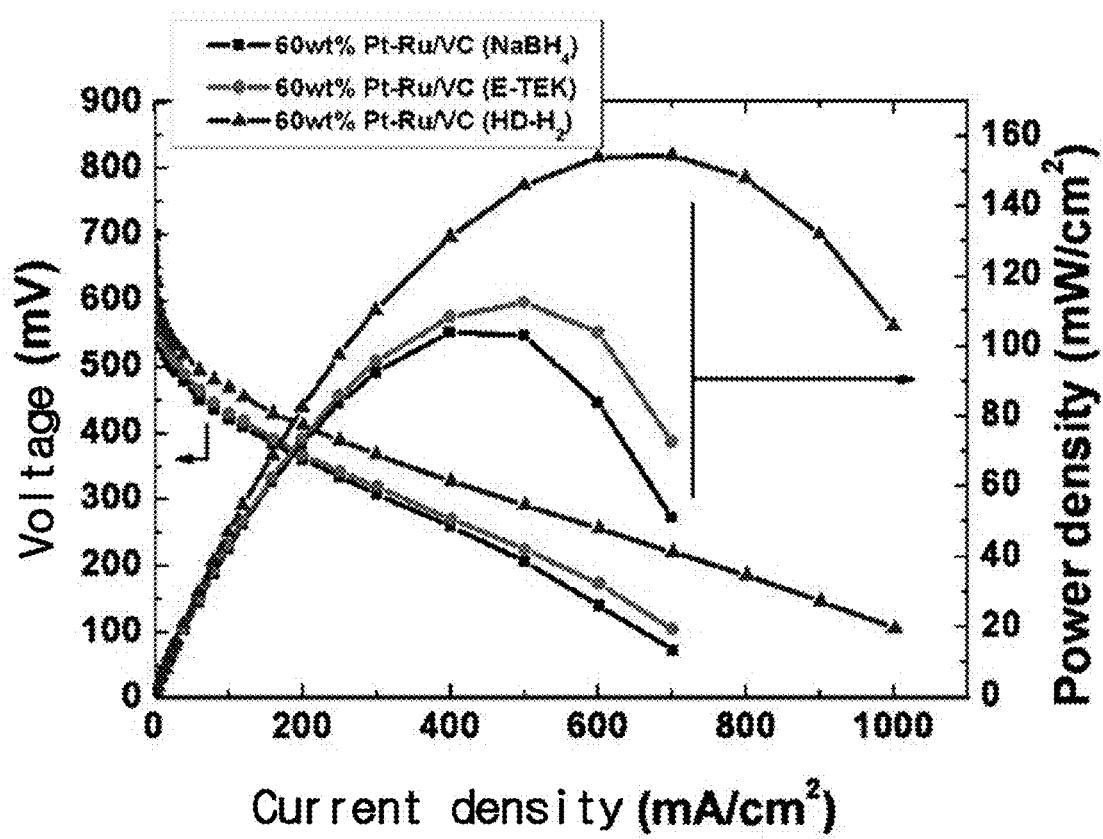
FIG. 19 shows results of polarization performance test for Pt—Ru (60 wt %)/VC (E-TEK) single cells of Example 3-1 and Comparative Example 3-1 at 60° C. under oxygen condition.

Polarization performance of the single cells using the Pt—Ru (60 wt %)/VC (E-TEK) single cells of Example 3-1 and Comparative Example 3-1 was compared. The polarization performance was evaluated using a potentiometer (WMPG-1000). FIG. 19 shows the results of polarization performance test for the Pt—Ru (60 wt %)/VC (E-TEK) single cells of Example 3-1 and Comparative Example 3-1 at 60° C. under oxygen condition. The fuel cell polarization at low current density region is due to the slow charge transfer on the electrode surface. The active polarization at 0.5 V is mainly affected by the catalytic activity. At 60° C. and 0.5 V in oxygen-fed mode, the single cell of Example 3-1 showed a current density of 63 $mA/cm^2$, which is higher by 80% than the single cell using Pt—Ru (60 wt %)/VC (E-TEK) catalyst (35 $mA/cm^2$) and by 91% than that of Comparative Example 3-1 (33 $mA/cm^2$). Example 3-1 showed less active polarization than Comparative Example 3-1, indicating that the former allows faster methanol oxidation. Example 3-1 showed a maximum power density of 154 $mW/cm^2$, which is higher than that of Comparative Example 3-1 (104 $mW/cm^2$) or the single cell using the Pt—Ru (60 wt %)/VC (E-TEK) catalyst (112 $mW/cm^2$).

Test Example 7

Chronoamperometric Measurement

Figure 20:
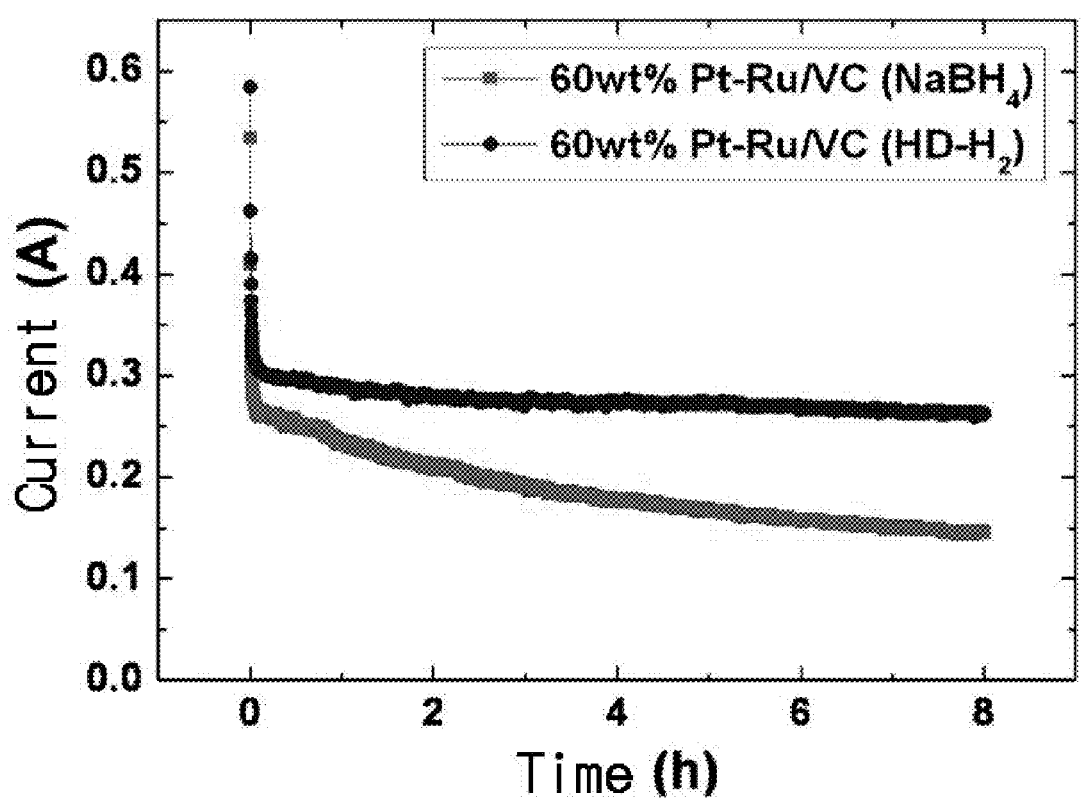
FIG. 20 shows chronoamperograms obtained at 0.5 V and 30° C. in oxygen-fed cathode mode for Example 3-1 and Comparative Example 3-1.

Chronoamperometric measurement was conducted for Example 3-1 and Comparative Example 3-1. FIG. 20 shows the chronoamperograms obtained at 0.5 V and 30° C. in oxygen-fed cathode mode for Example 3-1 and Comparative Example 3-1. Current response was higher for Example 3-1 in all measurement ranges than Comparative Example 3-1. This means that Example 3-1 shows much higher activity for methanol oxidation than Comparative Example 3-1. For Example 3-1, equilibrium was reached in about 6 hours, whereas Comparative Example 3 showed continued decrease of current response. This reveals that the former is more stable under the same anode operation condition. Example 3-1 showed a response current of 260 mA at 8 hours, which is improved by about 80% over Comparative Example 3-1 (150 mA), indicating that Example 3-1 allows much faster methanol oxidation than Comparative Example 3-1. This result is attributable to smaller size and more uniform dispersion of the Pt—Ru alloy nanoparticles of Example 3-1 than those of Comparative Example 3-1.

Test Example 8

Observation of Surface by HRTEM

Figure 21:
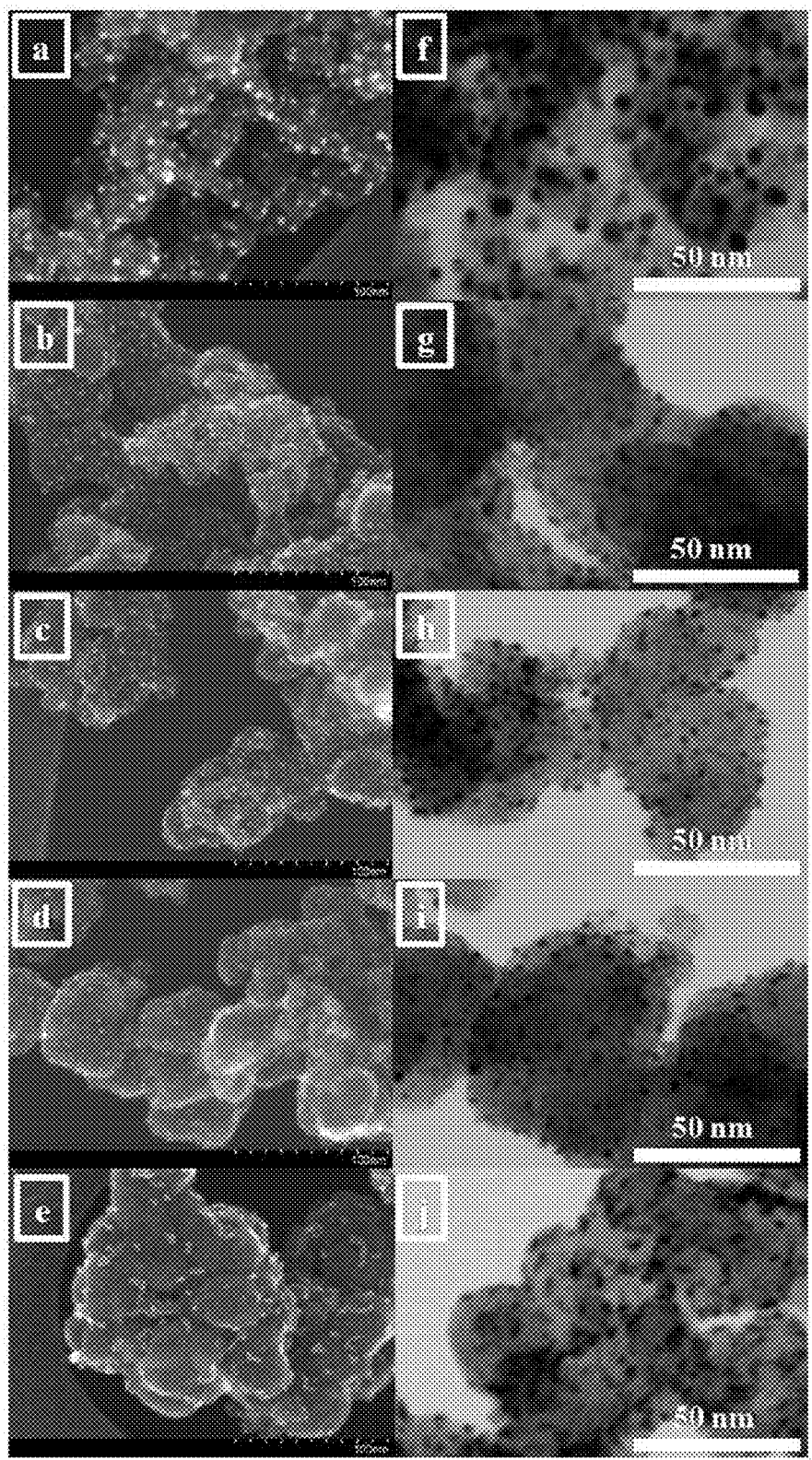
FIG. 21 shows HRTEM images of the catalysts of Examples 1-2 to 1-5 and Comparative Example 1-2.

HRTEM images of the catalysts of Examples 1-2 to 1-5 and Comparative Example 1-2 were obtained in the same manner as Test Example 1. FIG. 21 shows the HRTEM images of the catalysts of Examples 1-2 to 1-5 and Comparative Example 1-2. Referring to FIG. 21, spherical metal particles loaded on the support are observed for Example 1-2 (a, f), Example 1-3 (b, g), Example 1-4 (c, h) and Example 1-5 (d, i), whereas randomly distributed aspherical metal particles are observed for Comparative Example 1-2 (e, j). For Examples 1-2 to 1-5, it was observed that the metal particles prepared at higher pH have smaller size and more uniform size distribution.

Test Example 9

Evaluation of Polarization Performance

Figure 22:
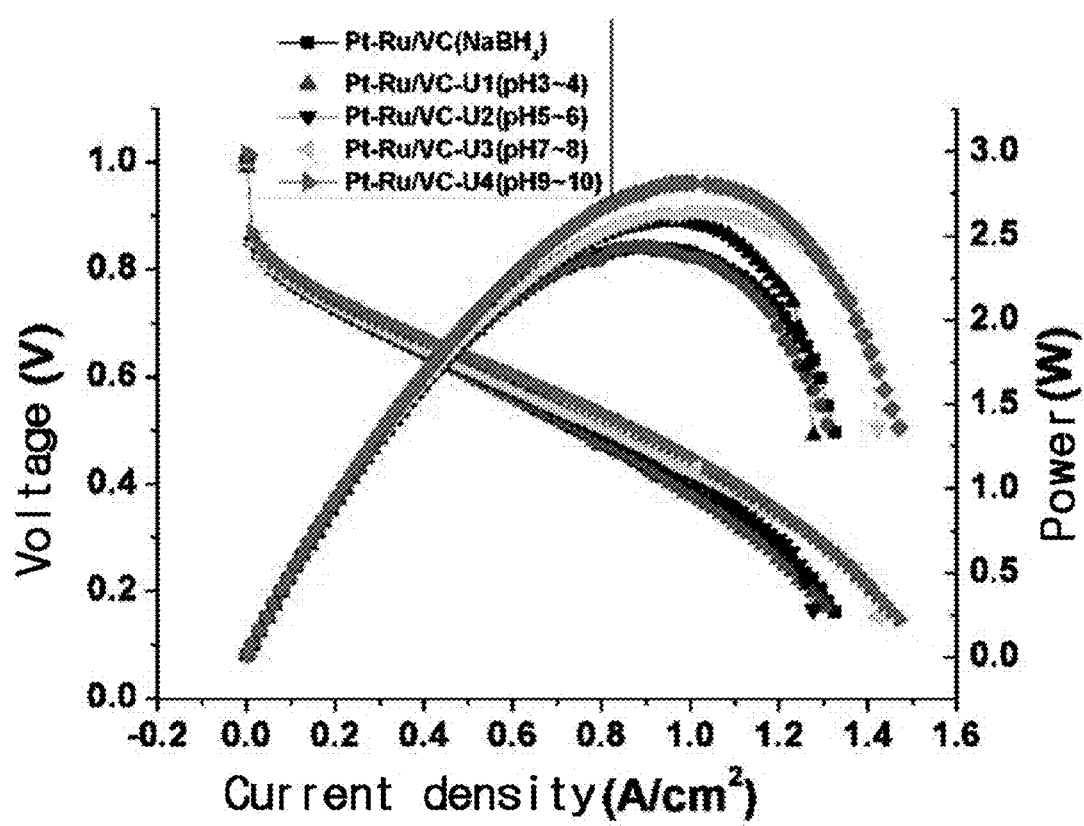
FIG. 22 shows performance of single cells of Examples 3-2 to 3-5 and Comparative Example 3-2 measured at 60° C. under oxygen condition.
Figure 23:
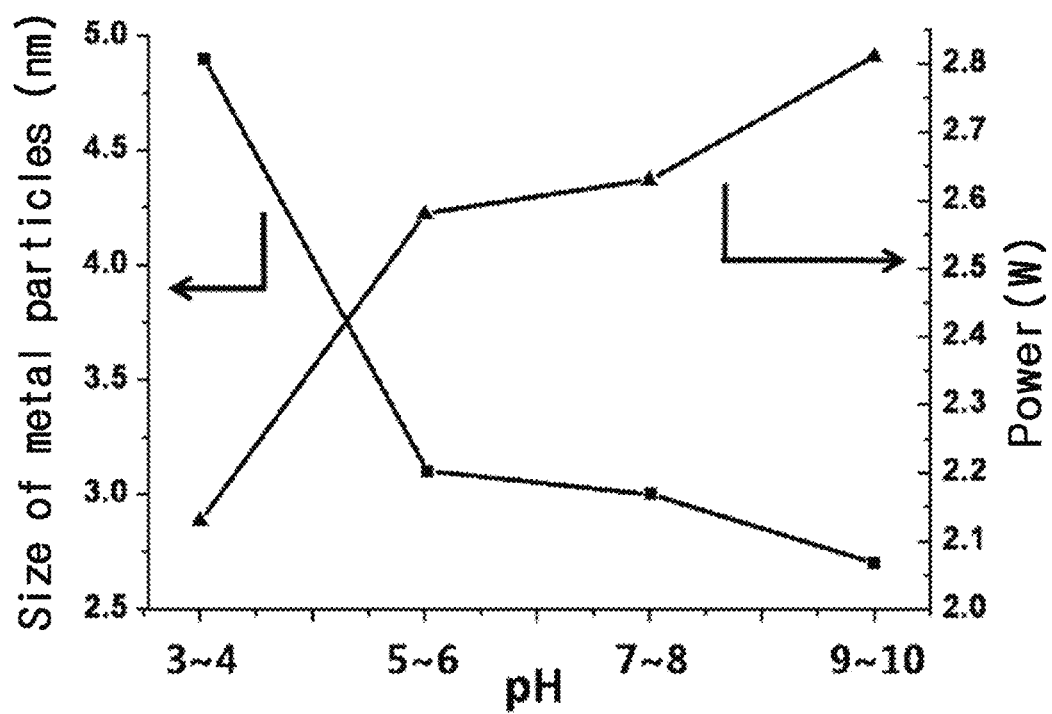
FIG. 23 shows relationships between the size of metal particles and single cell performance for Examples 3-2 to 3-5.

Polarization performance of the single cells of Examples 3-2 to 3-5 and Comparative Example 3-2 was tested in the same manner as Test Example 6. Hydrogen oxidation performance of the various 40 wt % Pt—Ru alloy catalysts prepared at different pHs was compared with the 40 wt % Pt—Ru alloy catalyst prepared in Comparative Example 3-2. FIG. 22 shows the performance of the single cells of Examples 3-2 to 3-5 and Comparative Example 3-2 measured at 60° C. under oxygen condition. Referring to FIG. 22, Examples 3-2 to 3-5 show higher current density and maximum power than Comparative Example 3-2. The maximum power of the catalysts prepared at pH 3-4, pH 5-6, pH 7-8 and pH 9-10 depending on the change in current density was 2.43, 2.58, 2.64 and 2.81 W, respectively. That is to say, it was identified that, as pH increases, the size of the catalyst particles decreases and the catalytic activity of the hydrogen fuel cell is improved. This is because the catalytic active area increases as the size of the catalyst particles decreases. The catalyst prepared at pH 9-10 showed the highest maximum power, improved by about 16% as compared to that of the catalyst prepared in Comparative Example 3-2 (2.43 W). FIG. FIG. 23 shows the relationship between the size of metal particles and the single cell performance for Examples 3-2 to 3-5. Referring to FIG. 23, it can be seen that the catalyst prepared at higher pH has smaller metal particles and exhibits higher single cell power. Especially at pH 5-6, the size of the metal particles decreases rapidly and, hence, the single cell power is improved rapidly.

The platinum/carbon catalyst prepared in accordance with the present disclosure has significantly improved catalytic activity since small particle size and uniform distribution of platinum particles can be attained while increasing the loading amount of platinum. Having large ECSA, the platinum/carbon catalyst may improve utilization efficiency and enhance output density when it is applied to a PEMFC. The method for preparing a platinum/carbon catalyst according to the present disclosure can reduce the manufacturing cost of the platinum/carbon catalyst and is environment-friendly since the procedure is achieved via a simple one-pot process in an aqueous solution at relatively low temperature.

And, the method for preparing a platinum alloy/carbon catalyst according to the present disclosure allows the loading of platinum alloy with small particle size and uniform distribution on the support since hydroxide ions are generated homogeneously in situ from the hydrolysis of urea and from the aqueous NaOH solution optionally added to adjust pH, and they react with the metal salt form the catalytic complex species uniformly deposited on the support. Thus, when used as an electrode catalyst of a fuel cell, the platinum alloy/support catalyst of the present disclosure may greatly enhance the catalytic activity for oxidation of fuel, e.g. methanol or hydrogen, and the fuel cell polarization performance. Furthermore, the alloy-based catalyst of the present disclosure may be useful as catalysts for various organic and electrochemical reactions, including epoxy reaction, Heck reaction, oxidation and reduction in a fuel cell or a lithium-ion battery, hydrogen storage, or the like, since very small (2-3 nm) metal particles are uniformly dispersed on the support and thereby provide larger area for catalytic reactions. In addition, the present disclosure provides an environment-friendly and cost-effective method for synthesizing a platinum-loaded catalyst since the catalyst can be synthesized under a mild condition in an aqueous solution at relatively low temperature.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing a catalyst with platinum loaded on a support, comprising:
   dissolving a water-soluble salt of a metal having catalytic activity and urea in water and dispersing a support to prepare a homogeneous dispersion solution;
   a stirring the resulting dispersion solution to deposit metal hydroxide particles on the surface of the support;
   adding sodium hydroxide to the dispersion solution of the support to adjust acidity to pH 5-12; and
   reducing the metal hydroxide particles deposited on the support, wherein said reducing the metal hydroxide particles is performed at 150-400° C. while supplying hydrogen,
   wherein the homogeneous dispersion solution is prepared by ultrasonic dispersion and
   wherein reducing the metal hydroxide particles is performed subsequent to the step of a stirring the resulting dispersion solution to deposit metal hydroxide particles on the surface of the support.

* * * * *

UNITED STATES PATENT AND TRADEMARK OFFICE
CERTIFICATE OF CORRECTION

| | |
|---|---|
| PATENT NO. | : 8,993,198 B2 |
| APPLICATION NO. | : 12/894897 |
| DATED | : March 31, 2015 |
| INVENTOR(S) | : Yu |

It is certified that error appears in the above-identified patent and that said Letters Patent is hereby corrected as shown below:

In the claims:

Column 24,
Line 37, "a stirring" should read --stirring--;
Line 48, "of a stirring" should read --of stirring--.

Signed and Sealed this
Twenty-second Day of December, 2015

Michelle K. Lee
*Director of the United States Patent and Trademark Office*